(12) United States Patent
Bruzi et al.

(10) Patent No.: US 12,372,267 B2
(45) Date of Patent: Jul. 29, 2025

(54) VENTILATION DEVICE

(71) Applicant: RESPIRECO Spolka z Ograniczona Odpowiedzialnoscia, Pleszew (PL)

(72) Inventors: Renata Bruzi, Pleszew (PL); Krzysztof Bruzi, Pleszew (PL)

(73) Assignee: RESPIRECO SPOLKA Z OGRANICZONA ODPOWIEDZIALNOSCIA, Pleszewo (PL)

( * ) Notice: Subject to any disclaimer, the term of this patent is extended or adjusted under 35 U.S.C. 154(b) by 256 days.

(21) Appl. No.: 17/797,723

(22) PCT Filed: Feb. 20, 2021

(86) PCT No.: PCT/EP2021/025072
§ 371 (c)(1),
(2) Date: Aug. 5, 2022

(87) PCT Pub. No.: WO2021/170295
PCT Pub. Date: Sep. 2, 2021

(65) Prior Publication Data
US 2023/0072527 A1    Mar. 9, 2023

(30) Foreign Application Priority Data

Feb. 24, 2020 (PL) .......................................... 433008

(51) Int. Cl.
*F24F 7/00* (2021.01)
*F24F 5/00* (2006.01)
(Continued)

(52) U.S. Cl.
CPC .......... *F24F 12/003* (2013.01); *F24F 5/0021* (2013.01); *F24F 7/013* (2013.01); *F24F 12/006* (2013.01)

(58) Field of Classification Search
CPC ......... F24F 7/00–7/08; F24F 2007/005; F24F 7/04; F24F 7/06; F24F 7/065; F24F 7/007;
(Continued)

(56) References Cited

U.S. PATENT DOCUMENTS

| | | | | |
|---|---|---|---|---|
| 5,826,443 | A * | 10/1998 | Ares | F25B 6/00 62/324.1 |
| 2012/0037342 | A1* | 2/2012 | Holloway | F24F 5/0021 165/104.21 |

(Continued)

FOREIGN PATENT DOCUMENTS

WO    WO-2016153371 A1 *  9/2016 ................ F24F 7/00

*Primary Examiner* — Frantz F Jules
*Assistant Examiner* — Jason N Thompson
(74) *Attorney, Agent, or Firm* — Andrzej Malarz, Esq.

(57) ABSTRACT

A ventilation device with a through housing that is a duct for an air jet flow having the through housing connected to an opening of a building partition, with a stationary regenerative heat exchanger and a pumping section formed of a centrifugal fan of constant rotation direction and a main reversible air jet driver with an individual drive arranged in series inside the housing, characterized in that the heat exchanger is provided with a metallic pressure vessel with at least one heat exchange system attached to walls of the pressure vessel, wherein an interior of the pressure vessel is filled with a thermodynamic working agent and connected to a cyclic discrete pressure control system of the working agent.

14 Claims, 28 Drawing Sheets

Figure 1:
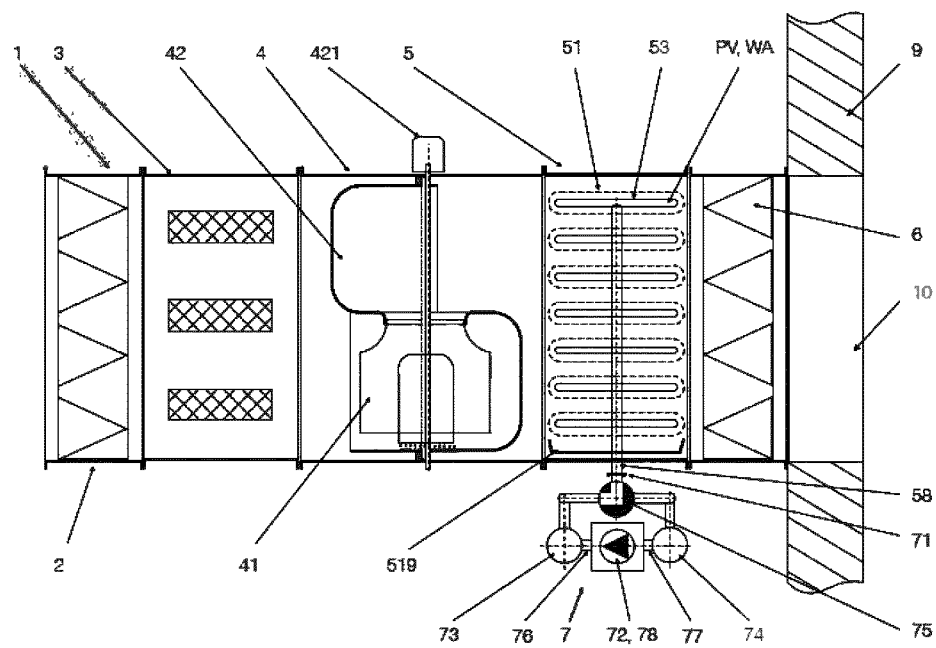

(51) Int. Cl.
  *F24F 7/007* (2006.01)
  *F24F 7/013* (2006.01)
  *F24F 7/04* (2006.01)
  *F24F 7/06* (2006.01)
  *F24F 7/08* (2006.01)
  *F24F 12/00* (2006.01)

(58) Field of Classification Search
  CPC ............... F24F 2007/001; F24F 12/003; F24F 2012/005; F24F 7/013; F24F 13/28; F24F 13/30; F28D 17/00; F28D 2015/0291
  See application file for complete search history.

(56) References Cited

U.S. PATENT DOCUMENTS

| | | | |
|---|---|---|---|
| 2013/0081795 A1* | 4/2013 | Janezich | F28F 9/04 |
| | | | 165/173 |
| 2013/0167534 A1* | 7/2013 | Ruck | F28D 20/003 |
| | | | 60/659 |
| 2014/0238055 A1* | 8/2014 | Dobbs | F24F 11/81 |
| | | | 62/89 |
| 2014/0273797 A1* | 9/2014 | Jensen | F24F 7/065 |
| | | | 454/251 |
| 2017/0089647 A1* | 3/2017 | Schnabel | F28F 3/022 |
| 2018/0230590 A1* | 8/2018 | Farquhar | B22F 3/1121 |
| 2018/0283709 A1* | 10/2018 | Al-Hallaj | F24F 5/001 |
| 2021/0164673 A1* | 6/2021 | Bruzi | F24F 7/003 |

* cited by examiner

VENTILATION DEVICE

The subject of the invention is a ventilation device with a function of heat recovery from the spent air jet, designed for various buildings of great cubage.

The well-known ventilation-air conditioning devices with a heat pump blow the cooled or heated fresh air to individual building rooms by means of a network of ventilation ducts and ventilators while using the exhausted air jet for evacuation of the useless heat of a thermodynamic agent phase change outside a building. These devices recover heat from the ventilation air based on classically configured heat pump systems functioning in the circulating mode while using only the latent heat of working agent phase changes. In the well-known solutions, the partial vacuum in an evaporator, necessary to evaporate a refrigerant, and the overpressure in a condenser, necessary to condense an agent, are reached using expenditure of energy coming from outside, with use of a mechanical or thermal method of vapour compression. A system of duct-free reversible ventilation of buildings, provided with ventilation and heat recovery devices, is also well-known. Ventilation devices used in this system are reversible axial fans located in individual building rooms. Each of the fans is mounted in an opening made in an external building wall whereat air filters, a muffler and a stationary regenerative heat exchanger are found within this opening. Inside this heat exchanger body, a flat or corrugated sheet pack is found and the sheets are parallel to each other and fastened in an air duct in parallel to the air flow direction. Moreover, the well-known simplest heat exchanger is in a form of a ceramic block wherein small ducts are formed for air flow. The well-known duct-free ventilation system requires use of at least two axial fans that operate in opposed phases. An inconvenience of this solution is a relatively small power of axial fans and resulting low capacity and low compression as well as low efficiency caused by high expenditures of energy in the aftermath of a fan motor start repeated every tens of seconds. Use of stationary regenerative heat exchangers in ventilation devices is restricted due to their considerable sizes and a relatively great weight. In the well-known regenerative heat exchangers, the heat of phase changes was not used so far although this process proceeds in well-known heat pumps with fans to remove heat of condensation and vaporization. Moreover, a heat exchanger in shape of a pipe filled with a working thermodynamic agent and plugged both ways, named commonly a "heat pipe", is well-known. The thermodynamic agent evaporates and condenses in the closed space of the pipe, the heat being transferred from one pipe end to the other. Pressure inside the pipe is constant. The thermodynamic agent evaporation and condensation occur in consequence of heat removal from and delivery to the pipe ends. The patent specifications PL 232075 B1 and WO 2018/030903 A1 describe also a device for control of air flow in an air duct, equipped with a centrifugal fan of constant rotation direction and a reversible air driver that are designed for reversing the air flow direction in this duct and provided for use in building ventilation systems.

Phase-change materials able to accumulate heat prolongedly are also known, especially solid or liquid substances that melt or solidify respectively in relative low temperatures, particularly paraffin.

A principal purpose of the invention is to eliminate the inconveniences of the well-known solutions by use of a modified heat exchanger in a ventilation device, with a heat recovery function, that is equipped with a fan with cyclic change of an air flow direction. In such a device, cycles of heat exchanger charging with thermal energy and discharging are supported by expenditure of external energy and coordinated with changes of the flow direction of the air that, after heating or cooling, is supplied to ventilated rooms in order to heat or cool them respectively or evacuated outside in opposite phases. Another purpose of the invention is increase of heat capacity of a regenerative heat exchanger without its weight increase. This effect can be obtained thanks to use of the latent heat of thermodynamic agent phase changes, condensation/evaporation that occur as a result of pressure changes inside the heat exchanger. A further purpose of the invention is obtainment of such a spatial structure of external heat exchanger elements that allows, on the whole surface of the heat exchanger, periodical uniform accumulation of moisture that condenses from the warm air after contact with heat exchanger walls cooled in consequence of the working agent evaporation inside it. At the same time, the new spatial structure of the heat exchanger should allow, in the hot phase, to complete evaporation of moisture accumulated on its surface heated as the result of the working agent condensation inside the exchanger.

The ventilation device according to the invention has a through housing that is a duct for air jet flow and is connected to a building partition opening whereat a stationary regenerative heat exchanger and an air pumping section formed of a centrifugal fan of constant rotation direction and a main reversible air jet driver with an individual drive are arranged in series inside the housing.

According to the invention, the ventilation device is characterized in that the heat exchanger is provided with a metallic pressure vessel with at least one heat exchange system affixed to its walls, this vessel interior being filled with a thermodynamic working agent and connected to a cyclic discrete control system of the working agent pressure. The thermodynamic working agent in the heat exchanger pressure vessel has a form of water or low-boiling mixture of hydrocarbons or ammonia or carbon dioxide. The pressure vessel interior is additionally filled with a porous material of high heat conduction and abilities of capillary holding the liquid form of the working agent to maintain the condensed working agent in form of as thin film as possible or as fine drops as possible in immediate contact with the pressure vessel walls. The porous material in the heat exchanger vessel is an open-cell metallic or ceramic foam, a granular bed of any material or a structural filling formed of metallic fibres.

The pressure vessel consists of many mutual parallel segments that are connected each other with pressure fasteners and attached to a pressure connector of the pressure control system through a pressure collector. Preferably, the pressure vessel segments are plate elements in the form of flat compartments that are spread horizontally and in accordance with the air flow direction. Each flat horizontal heat exchanger compartment is provided with two heat exchange systems that are arranged one over the other and made of material of high heat conduction. In turn, each heat exchange system in the horizontal compartment of the pressure vessel consists of many vertical ribs that are parallel to the air flow direction, located inside a horizontal tray and connected permanently to its bottom to maintain good thermal conduction. The upper heat exchange system is fastened to the flat compartment recumbently, so that the tray bottom adheres directly to the upper surface of this compartment. The lower heat exchange system is fixed to the flat compartment in hanging position, so that all ribs are fastened to the lower surface of this compartment and the tray is underslung to the vertical ribs. In another embodiment, each heat exchange system of the horizontal pressure vessel compartment consists of hygroscopic lining of metallic foam or metallic fibrous structure that is located inside the horizontal tray and connected permanently to its bottom to maintain good thermal conduction. The upper heat exchange system is fastened to the flat compartment recumbently, so that the tray bottom adheres directly to the upper surface of this compartment. The lower heat exchange system is fixed to the flat compartment in hanging position, so that the hygroscopic lining is fastened to the lower surface of this compartment while the tray is underslung to this lining. In another embodiment of the invention, the pressure vessel segments are plate elements in the form of parallel flat compartments spread vertically and in accordance with the air flow direction. Each flat vertical compartment of the pressure vessel has a heat exchange system formed of longitudinally oriented horizontal gutters that are made of material of high heat conduction and connected permanently to opposite external surfaces of this compartment to maintain good thermal conduction. In another embodiment, each flat vertical compartment of the pressure vessel has the heat exchange system in the form of hygroscopic lining of metallic foam or metallic fibrous structure that is made of material of high heat conduction and connected permanently to the opposite external surfaces of this compartment to maintain good thermal conduction. Preferably, the pressure vessel segments are in the form of parallel tubular segments that are spread horizontally and also perpendicularly to the air flow direction. Each horizontal tubular segment of the pressure vessel has the heat exchange system in the form of a set of transverse ribs, bottom edges of which are joined with a gutter spread horizontally. In another embodiment, each horizontal tubular segment of the pressure vessel has a heat exchange system in the form of hygroscopic lagging of metallic fibrous structure or open-cell metallic foam structure, edges of which are joined with a gutter spread horizontally.

In another embodiment else, the pressure vessel segments are in the form of parallel tubular segments that are spread vertically and also perpendicularly to the air flow direction. In this embodiment, each vertical tubular pressure vessel segment has the heat exchange system in the form of conical ribs arranged one over the other that are vessels for condensing moisture. In another embodiment, each vertical tubular pressure vessel segment is equipped with a heat exchange system in the form of hygroscopic lagging of metallic fibrous structure or open-cell metallic foam structure with conical ribs that are arranged along the tubular segment axis. Moreover, a heat exchange system in the pressure vessel can be a solid of porous material wherein its parallel segments are plunged. Preferably, the porous solid is formed of material of metallic fibrous structure or open-cell metallic or ceramic foam structure. A regenerative heat exchanger is provided with an emergency drip tray located in the lower part of the housing, under the heat exchange system, the tray being used to accumulate excess of condensed moisture dripping from cool surfaces of the heat exchange system. This moisture comes from the air flowing around the heat exchanger when the working agent inside the pressure vessel is in the process of evaporation. The emergency drip tray of the heat exchanger protects the device interior against flooding by water condensate. The emergency drip tray is in the form of a tray without outlet, provided with an electric heating element that is used for evaporation of the water accumulated in the tray when the working agent is being condensed in the pressure vessel.

Preferably, the emergency drip tray has a sprinkling system for the heat exchange system, equipped with a water condensate pump. The process of heat exchange system sprinkling that is carried out first of all in a hot climate or when condensate cannot be drained to sewerage is used to get rid of water excess from the drip tray and, at the same time, to improve efficiency of heat removal from the heat exchanger into the air flowing around it when the working agent is being condensed in the pressure vessel. In another embodiment, the emergency drip tray of the heat exchanger is provided with a gravitational or forced outlet of water condensate into sewerage.

The cyclic discrete control system of the working agent pressure is provided with a vapour compressing device, an outlet port of which has connection with a high pressure buffer vessel and a high pressure sensor, and an inlet port has connection with a low pressure buffer vessel and a low pressure sensor. Moreover, this system is provided with a three-position two-way valve that is included in the working agent cycle and allows selection of one of two paths of the working agent flow as well as cut-off of both pressure vessels from the cyclic discrete control system of the working agent pressure. The two-way valve is used to open or close the flow path of this part of the compressed working agent in gaseous phase that is moved from the high pressure buffer vessel in the working agent pressure control system into the pressure vessel in the heat exchanger and also to open or close the flow path of this part of working agent vapours that is moved from the heat exchanger pressure vessel into the low pressure buffer vessel in the working agent pressure control system. The vapour compressing device is a substantially well-known compressor, however, a well-known household device, equipped with a working agent compression system that is connected to the high pressure buffer vessel through a high pressure conduit and to the low pressure buffer vessel through a low pressure conduit in the working agent pressure control system can be used as well.

The two-way valve of the cyclic discrete control system of the working agent pressure has an electric drive synchronized with the electric drive of the reversible air jet driver by means of an electronic control system.

To allow additional use of waste heat in the ventilation device, a heat accumulation module is located between the heat exchanger and the building partition opening, and a secondary reversible air driver with its individual drive is connected to the module on the building partition opening side, the secondary air driver drive being synchronized with the main air driver drive by means of an electronic control system. The secondary air driver has a longitudinal duct wherein a uniform rotational body built of two bowls adherent to each other and open into the opposite sides, and divided with a circular flange, is crosswise bearing-mounted. This flange is spread perpendicularly to the body rotation axis and has a central opening. A longitudinal partition with a concave arched rim that is in mesh with the body flange is formed in the secondary driver duct. The secondary driver duct is divided into two longitudinal zones by means of the partition and the flange. The heat accumulation module consists of a flow heat store and a shunt duct spread along it. The secondary air driver on the heat accumulation module side has two connectors whereto the end parts of the heat store and the shunt bypass duct are attached, and the opposite end parts of the heat store and the shunt duct are attached to the heat exchanger by means of a pipe tee. The heat store consists of two air distribution compartments that are separated from each other with two opposite partitions and a closed compartment formed between them and filled with a heat storing material. Each of the heat store partitions has openings wherein the ends of many parallel pipes for air flow are mounted tightly.

The heat store is provided with cutting off air dampers that are located in inlets of the air distribution compartments. One of the air distribution compartments is provided with an air distribution system consisting of a set of air valves driven individually and each of them closes at least one pipe for air flow. The heat storing material in the closed compartment of the heat store is a well-known liquid substance that solidifies at room temperature. The set of valves allows selective air flow through all or some of the heat store pipes to obtain effective use of the phase change phenomenon in the heat storing material. The secondary air driver allows routing the air jet flow through the shunt duct or the heat store regardless of the air flow direction. Routing the air jet flow is carried out depending on seasonal external environment and working conditions of the heat exchanger in such a manner that the useless heat of condensation is stored within the cooling summer period, however, it is received from the store within the heating winter period.

The device according to the invention allows also heat storage in day-to-day cycles in the summer season while the overnight cooling of the free air is used to charge the store with coolness at night.

Thanks to the solution according to the invention, besides the classical exchange of the sensible heat, the latent heat that comes out during phase exchange of the thermodynamic working agent in the pressure vessel is also used in the regenerative heat exchanger. The metallic vessel jacket and elements connected to it substantially participate in the sensible heat exchange process, however, these elements transfer also heat from the warm air flowing around the exchanger to the working agent that absorbs considerable heat quantity during evaporation and cools the heat exchanger walls and, in consequence, cools the air flowing around. A similar effect occurs during condensation of the working agent that transfers considerable heat quantity to the heat exchanger material and heats up the air flowing around it. Finally, the heat capacity of the heat exchanger increases in connection with limitation of its size and weight.

Such a run of heat exchange processes and their advantageous effects are obtained thanks to cyclic changes of the thermodynamic working agent state of aggregation induced intentionally inside the pressure vessel as well as changes of state of aggregation of moisture included in the fresh or spent air on external surfaces of the heat exchanger through coordinated control of variations of working agent pressure and direction of air flow through the heat exchanger. New constructional solutions of the heat exchanger as well as the appropriate selection of materials from which its elements are made have essential influence on obtainment of advantageous invention effects. Thanks to the above, during the working agent evaporation cycle inside the pressure vessel, the condensing moisture can be held directly on external surfaces of the heat exchanger as well as this condensed moisture can be evaporated during the working agent condensation cycle inside the pressure vessel. Moreover, thanks to the solution according to the invention, the ventilation device can be used to store, prolongedly or fugitively, both the waste heat released in process of ventilation air heat treatment and the passive heat from the free air.

Figure 2:
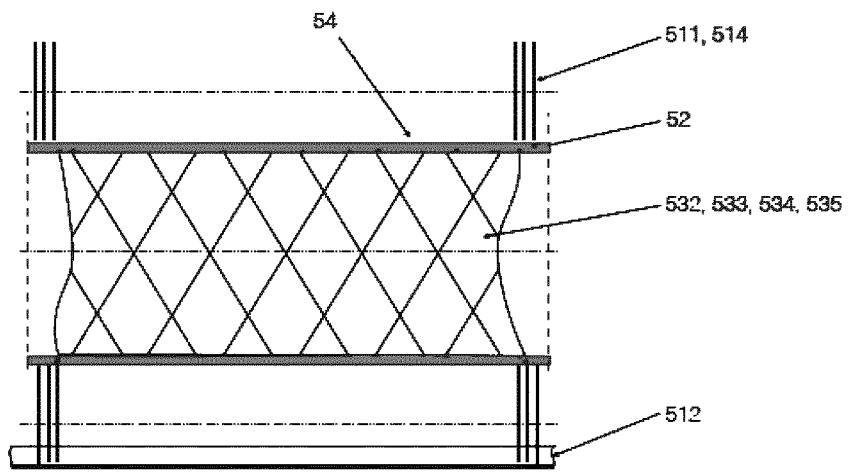
Figure 3:
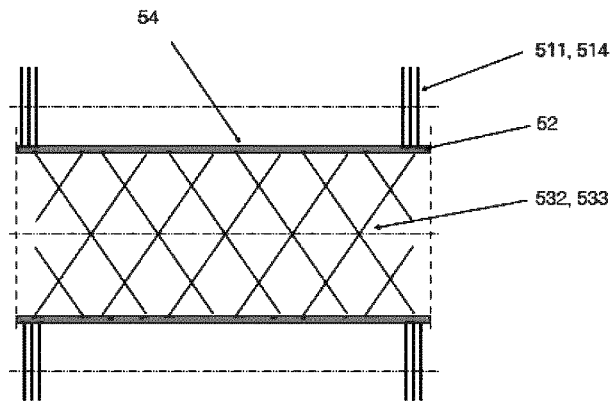
Figure 4:
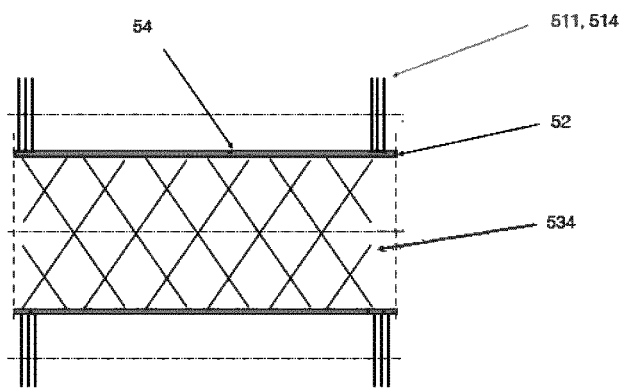
Figure 5:
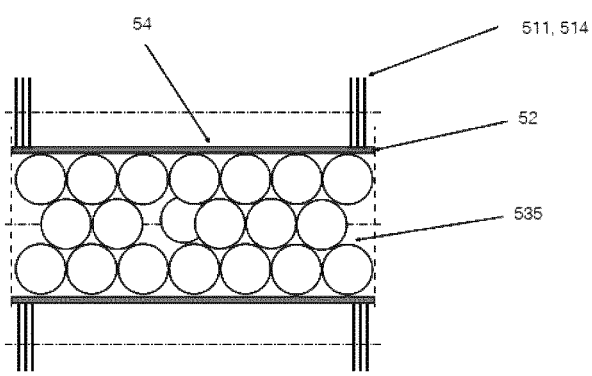
Figure 6:
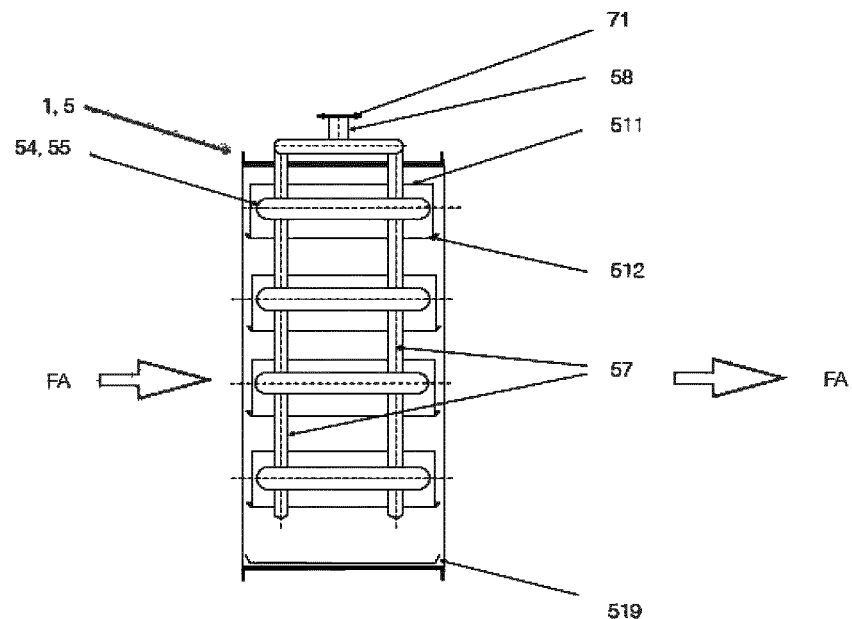
Figure 6A:
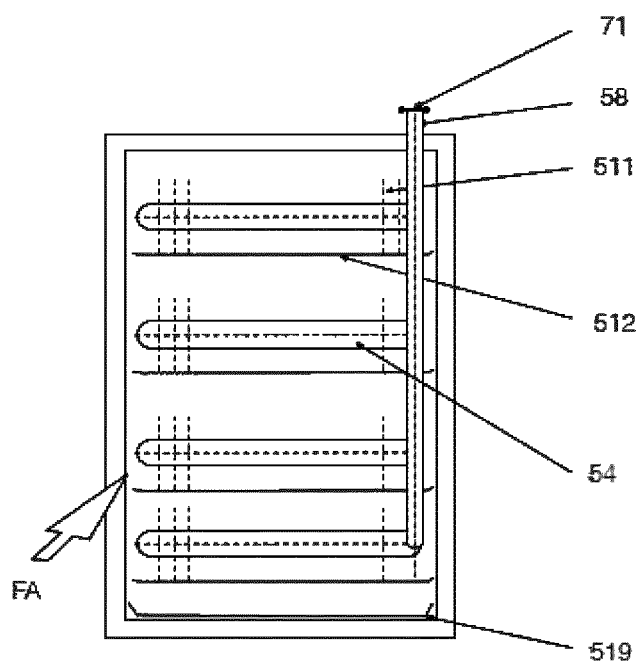
Figure 6B:
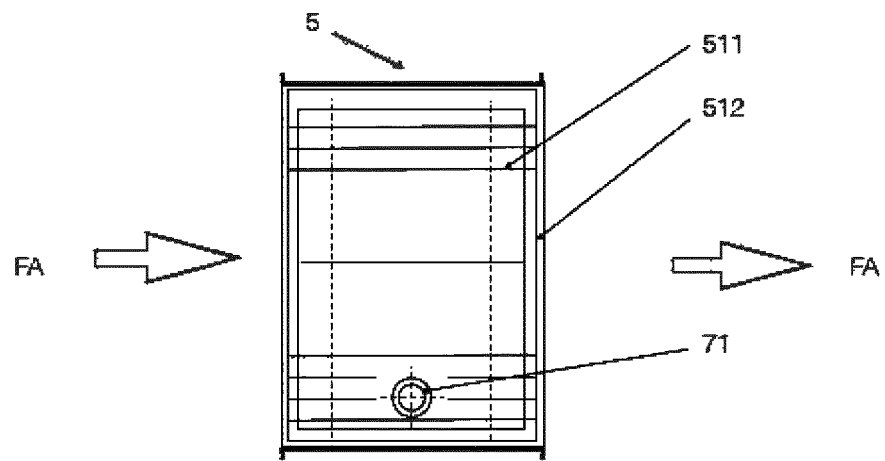
Figure 7:
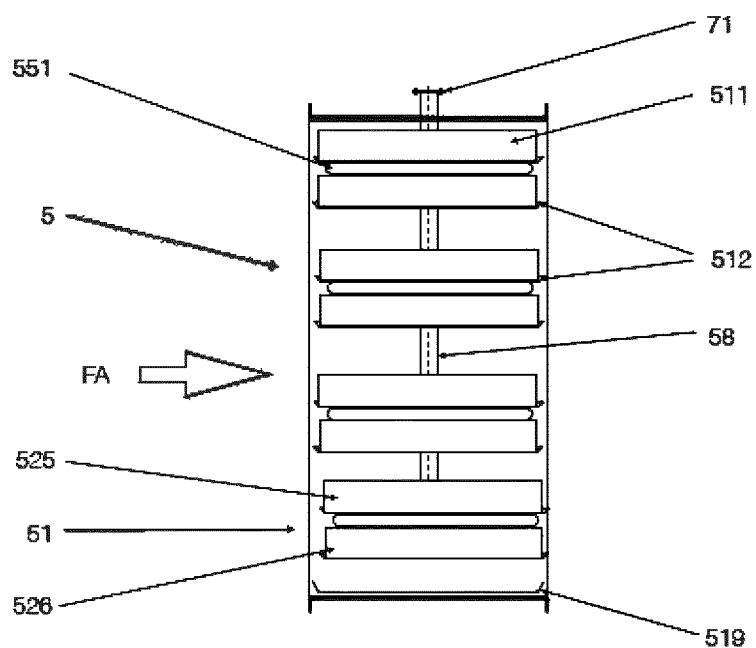
Figure 7A:
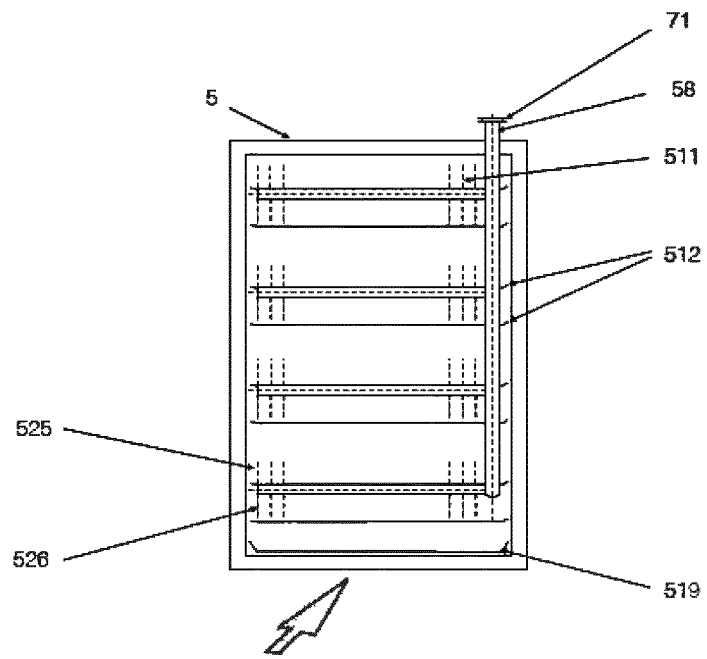
Figure 7B:
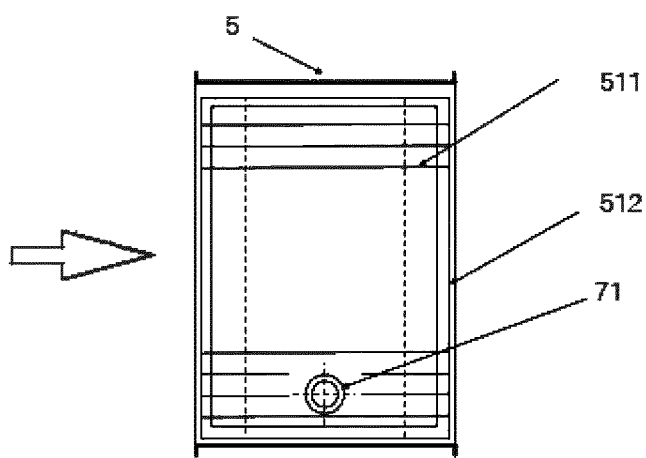
Figure 8:
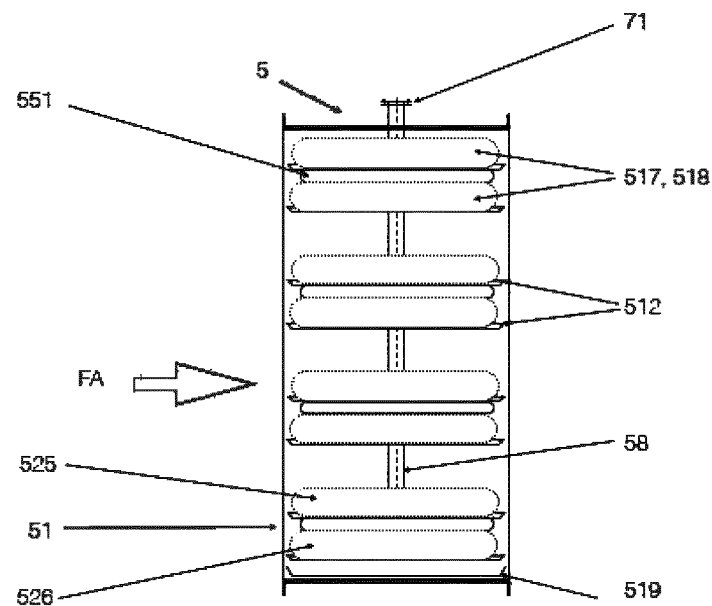
Figure 8A:
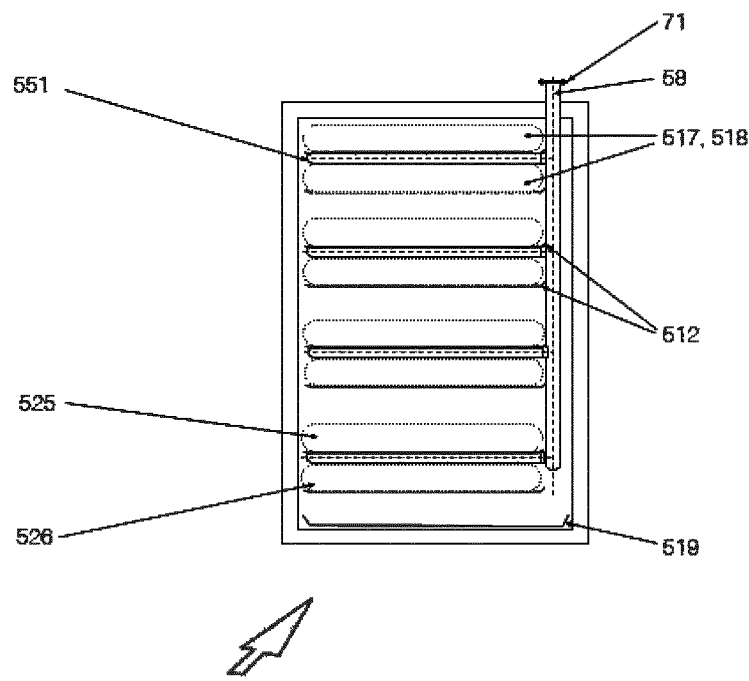
Figure 8B:
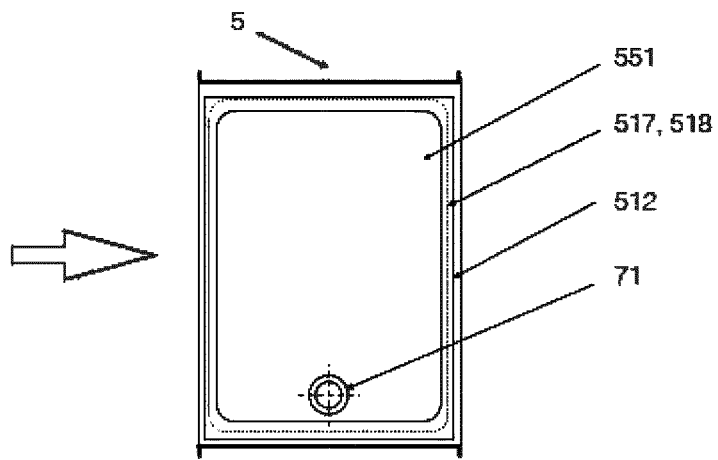
Figure 9:
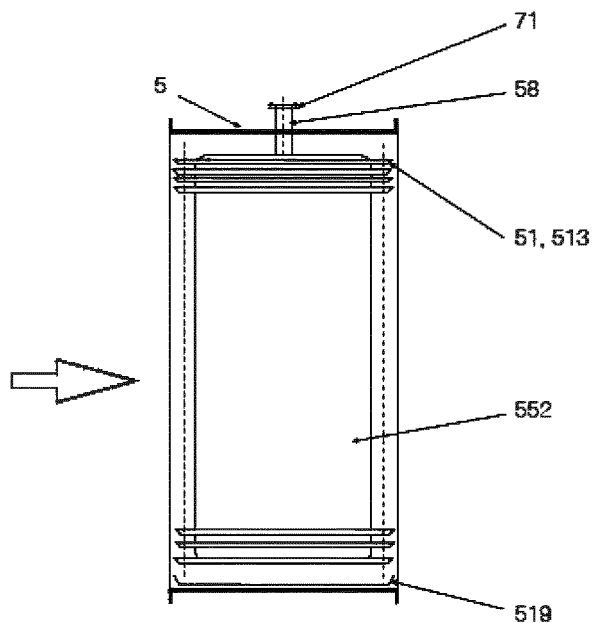
Figure 9A:
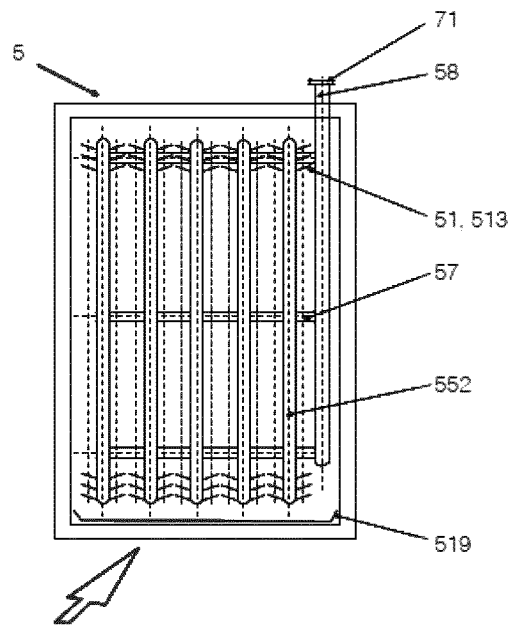
Figure 9B:
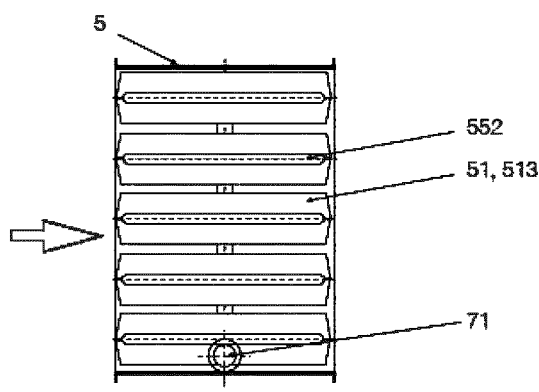
Figure 10:
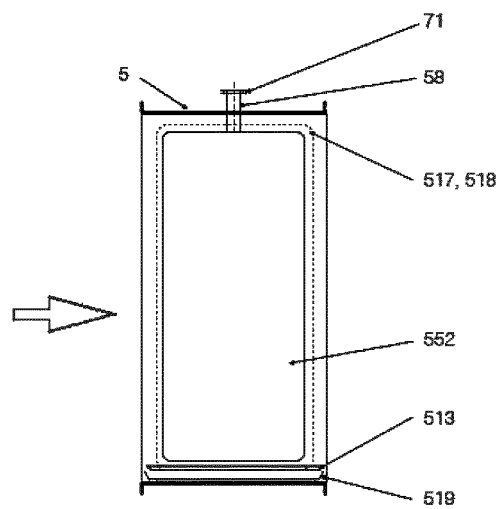
Figure 10A:
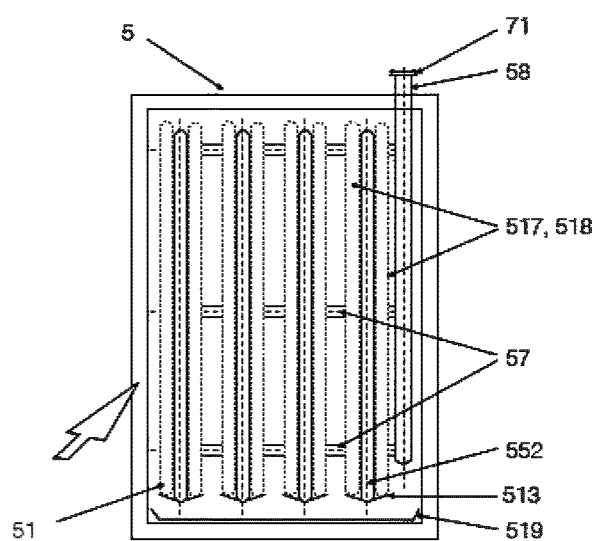
Figure 10B:
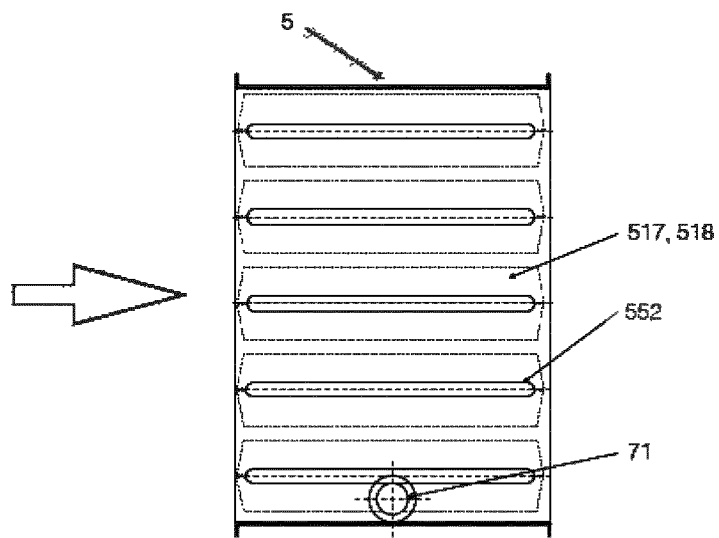
Figure 11:
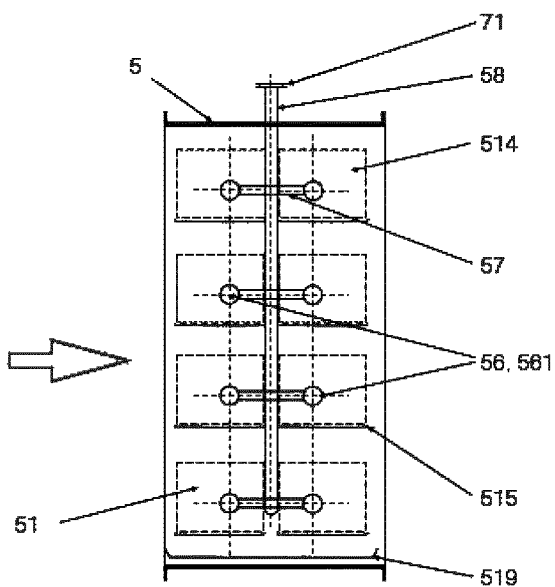
Figure 11A:
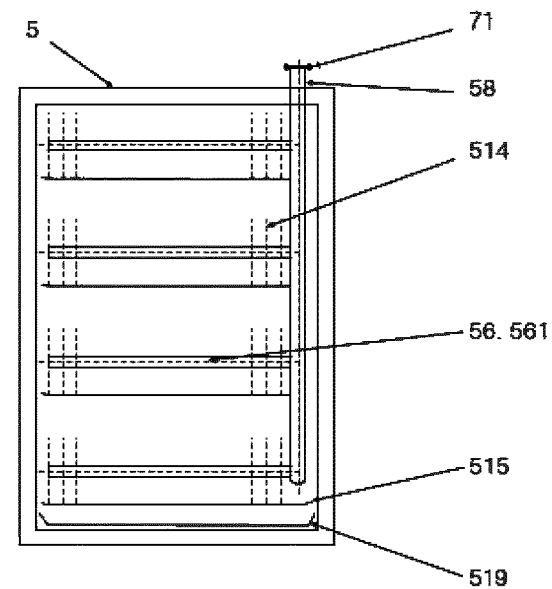
Figure 11B:
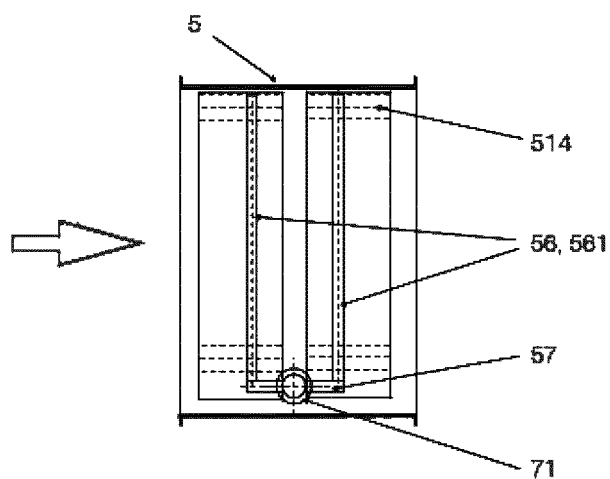
Figure 12:
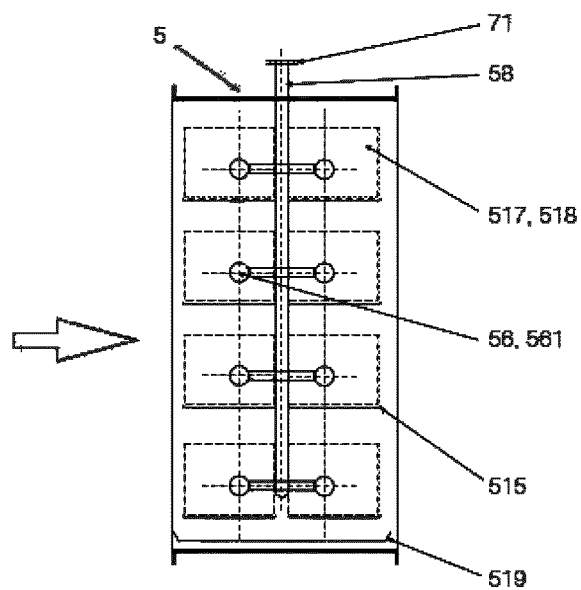
Figure 12A:
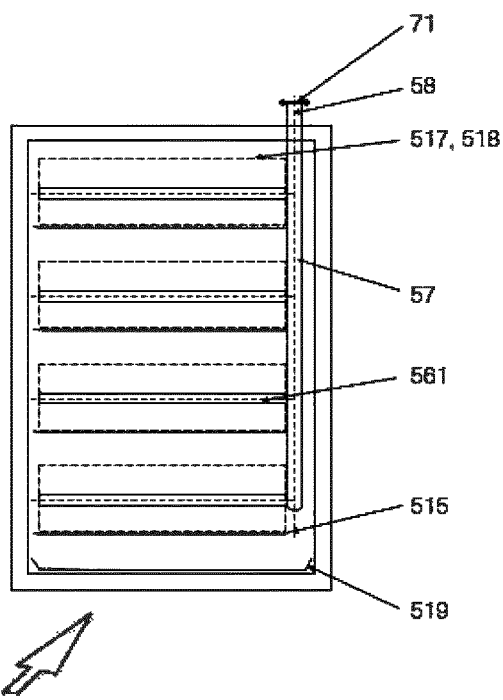
Figure 12B:
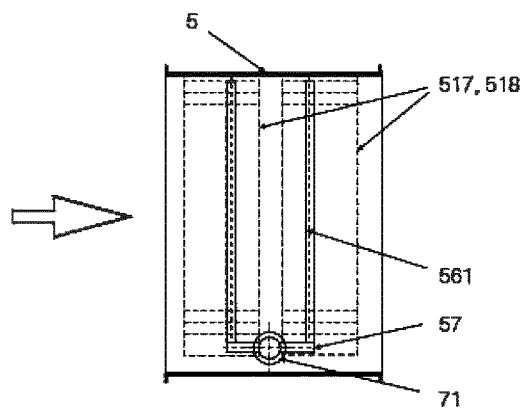
Figure 13:
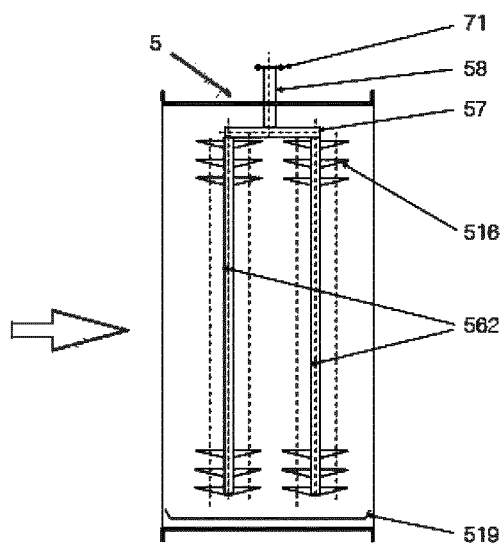
Figure 13A:
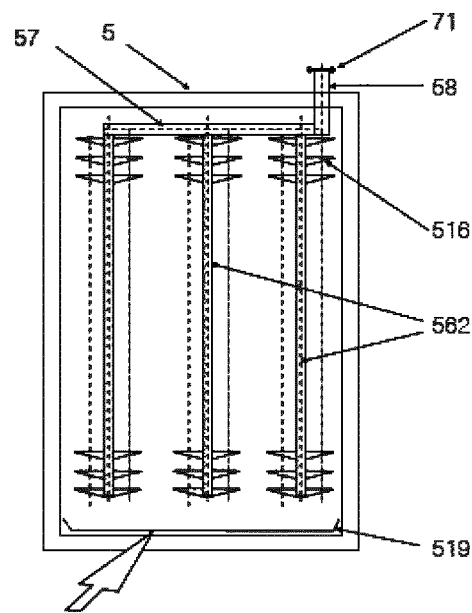
Figure 13B:
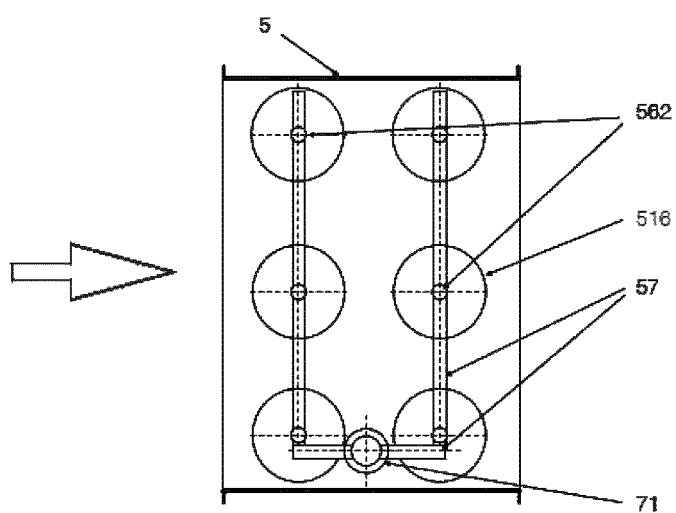
Figure 14:
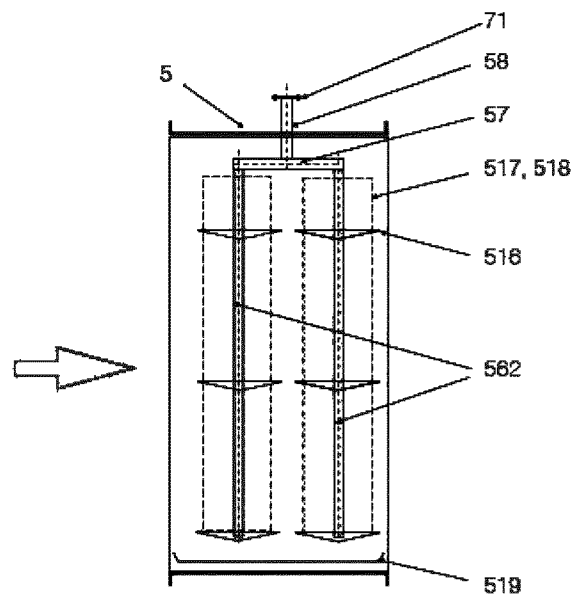
Figure 14A:
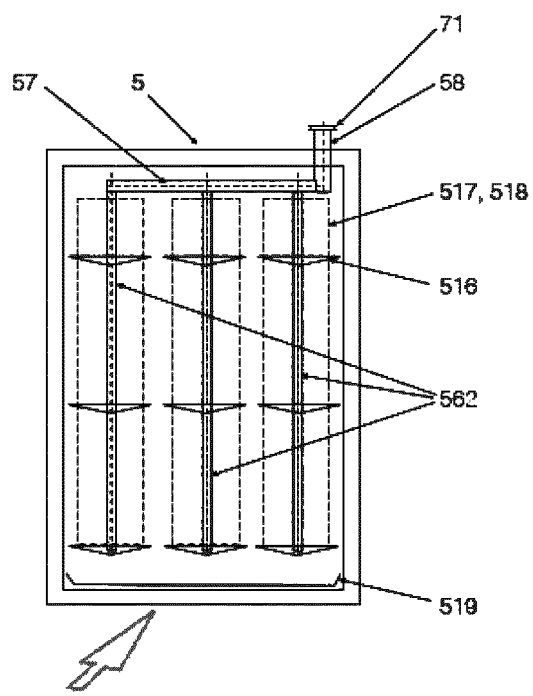
Figure 14B:
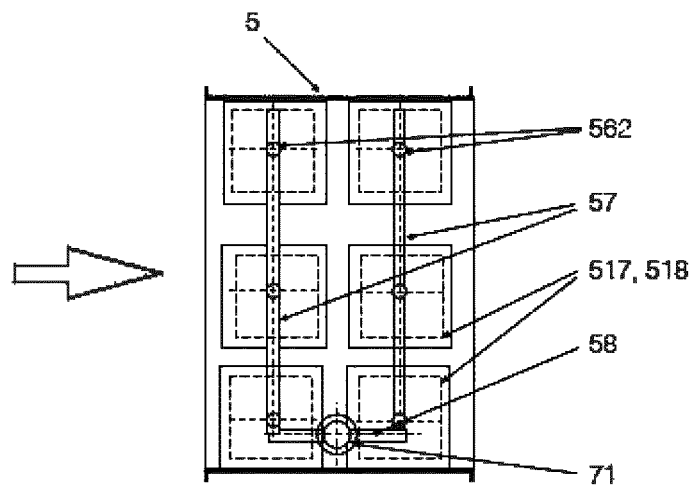
Figure 15:
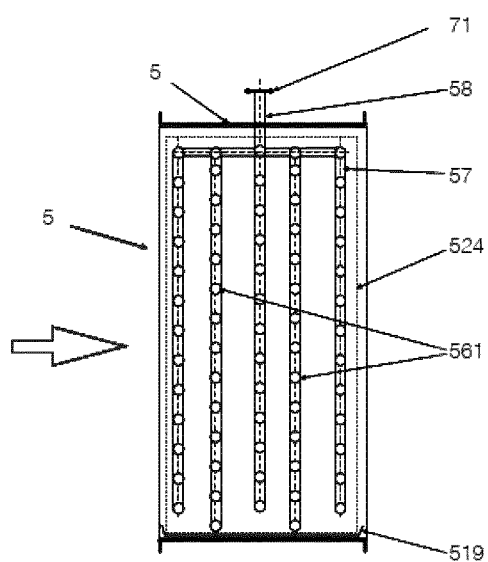
Figure 15A:
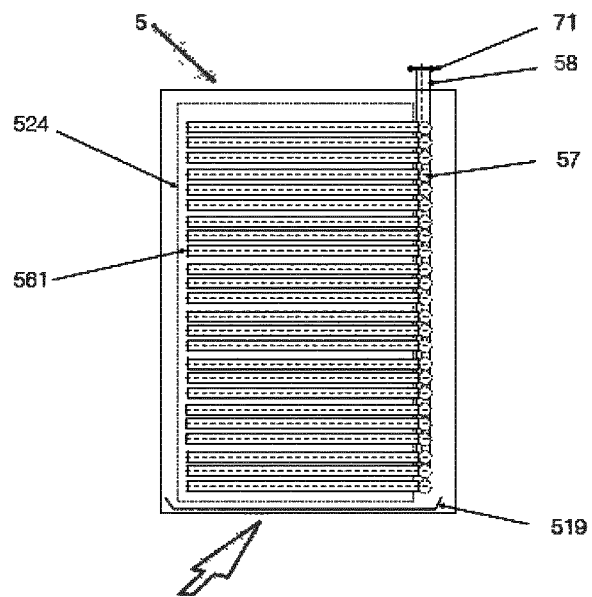
Figure 15B:
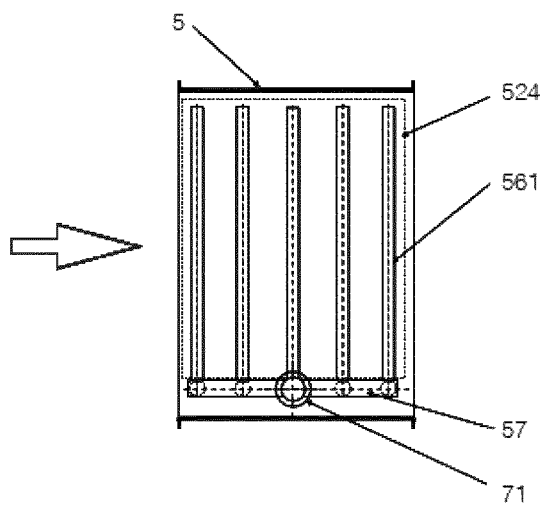
Figure 16:
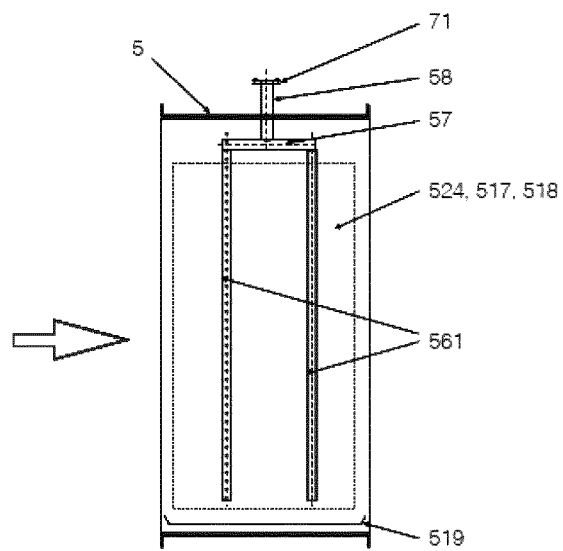
Figure 16A:
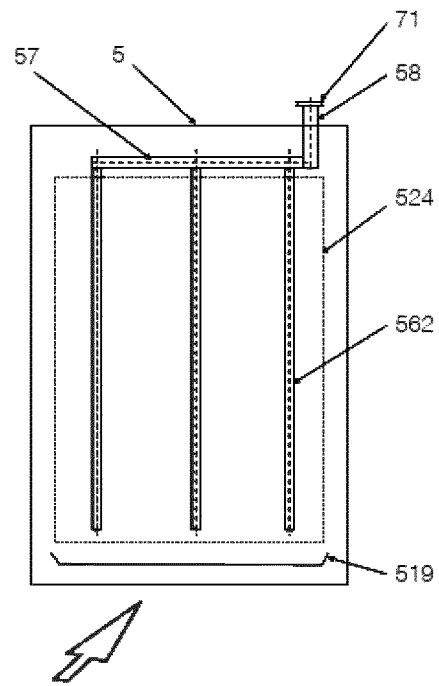
Figure 16B:
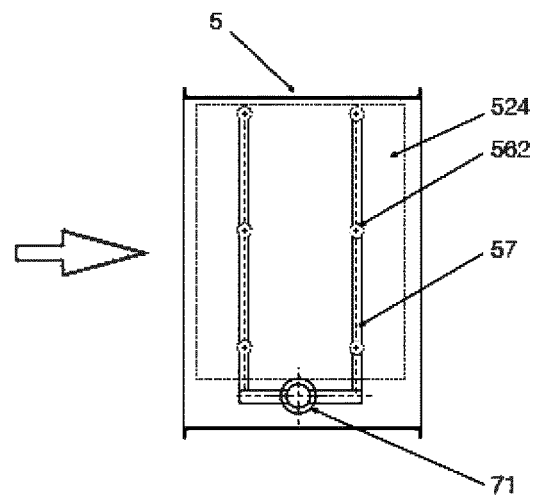
Figure 17:
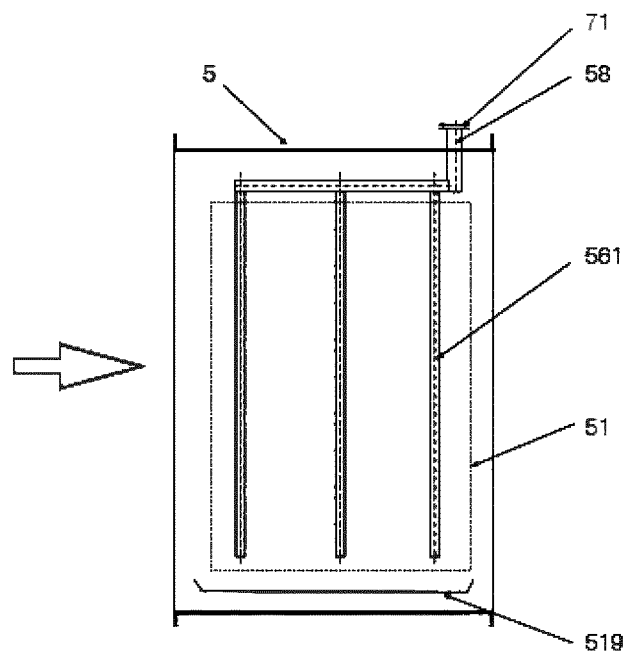
Figure 18:
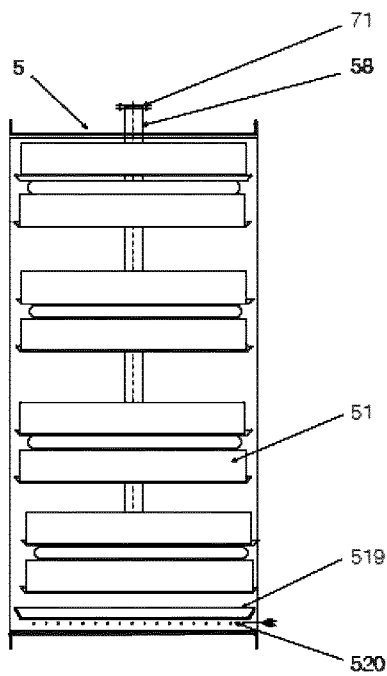
Figure 19:
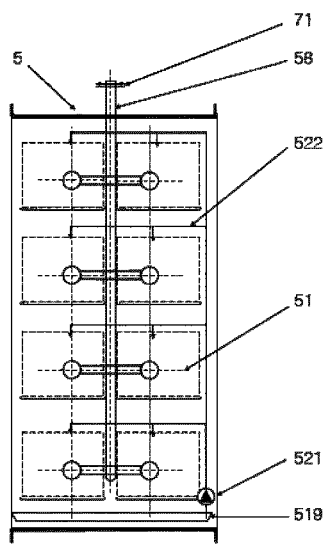
Figure 20:
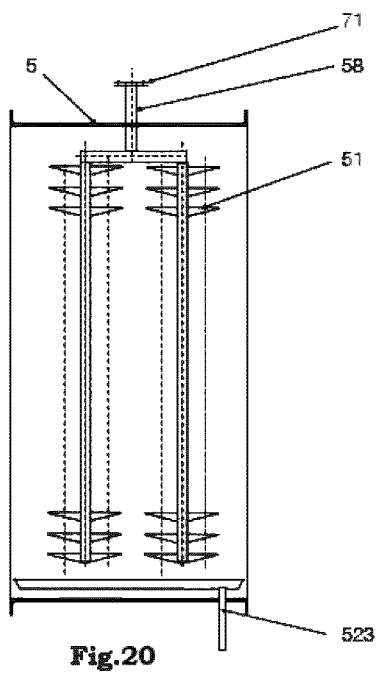
Figure 21:
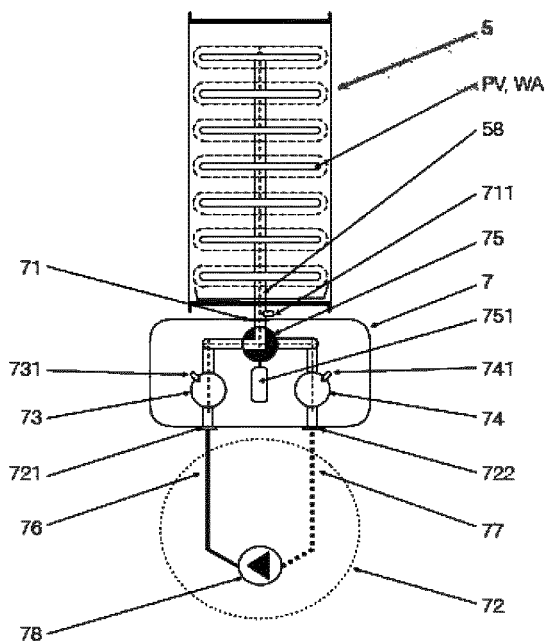
Figure 22:
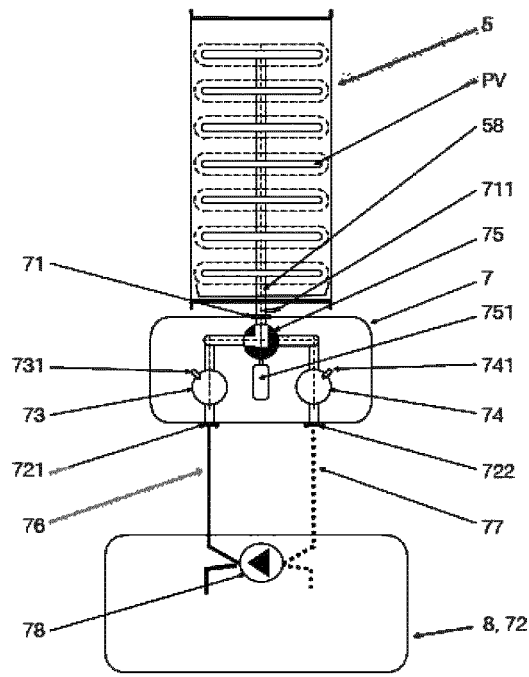
Figure 23:
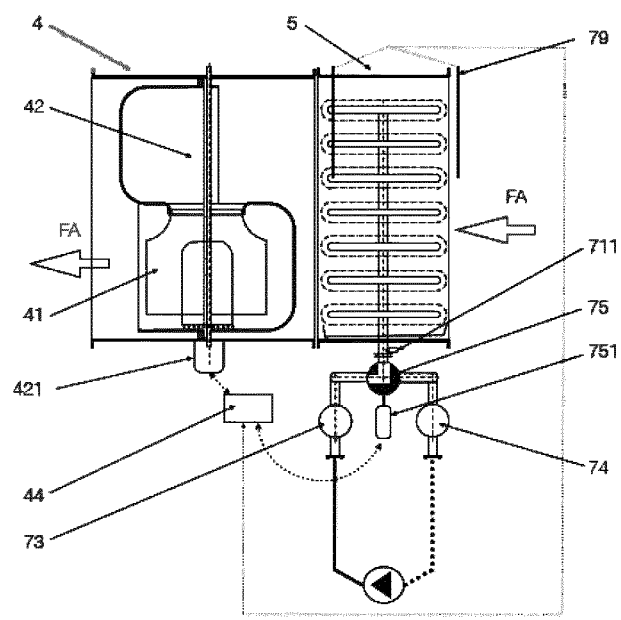
Figure 24:
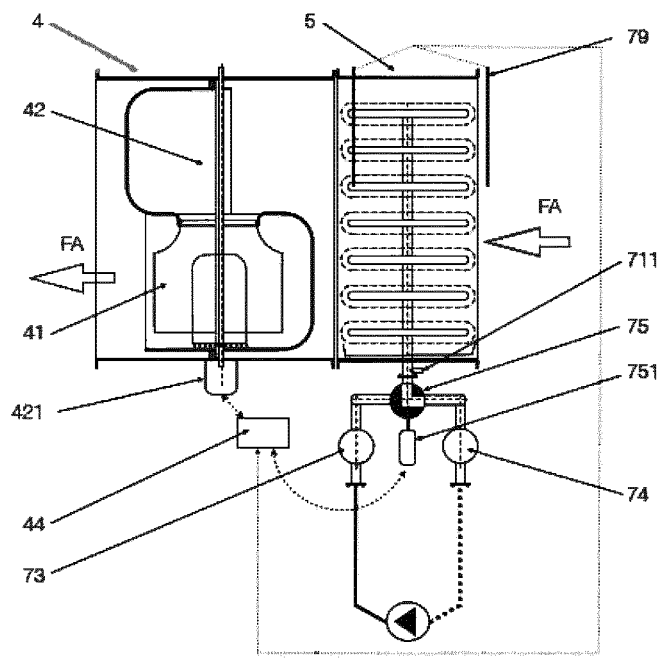
Figure 25:
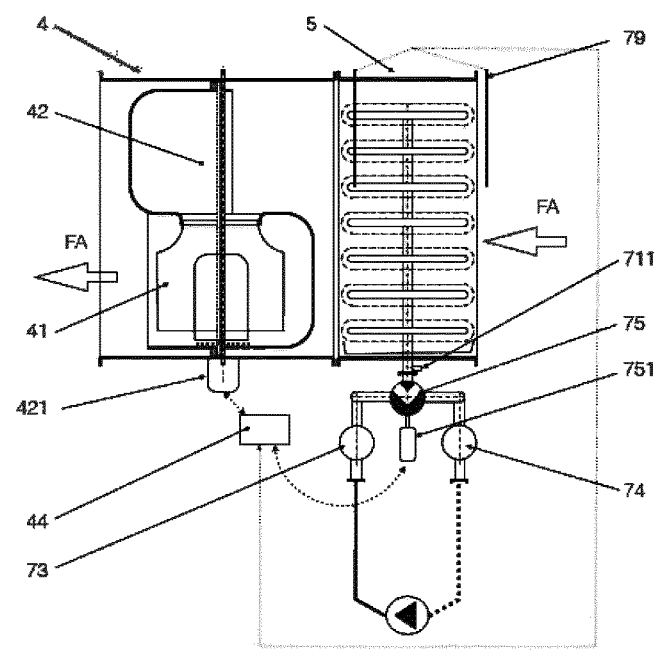
Figure 26:
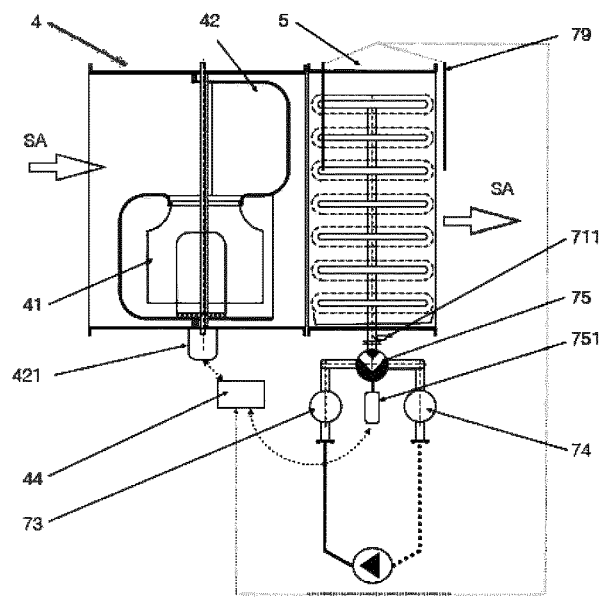
Figure 27:
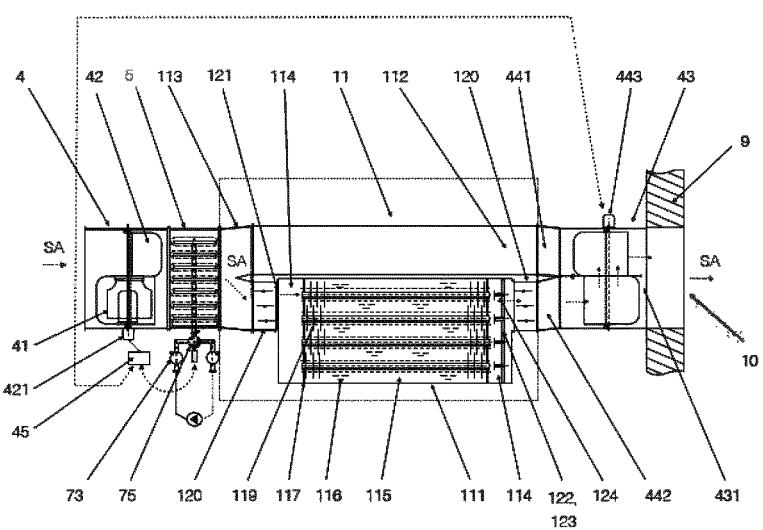
Figure 28:
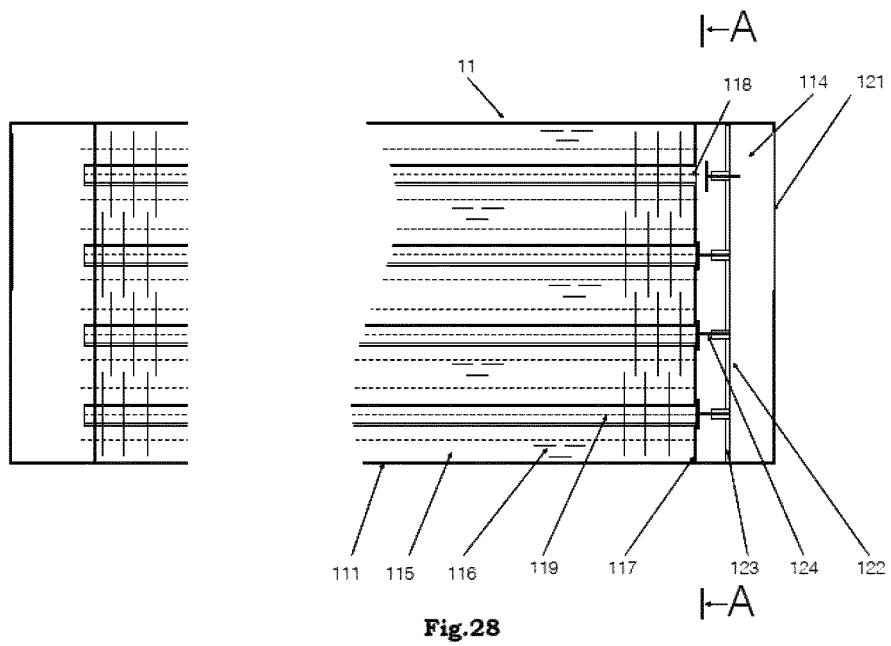
Figure 29:
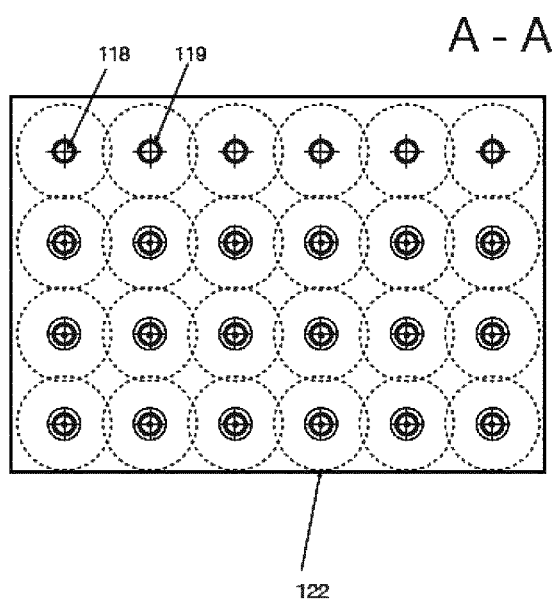
Figure 30:
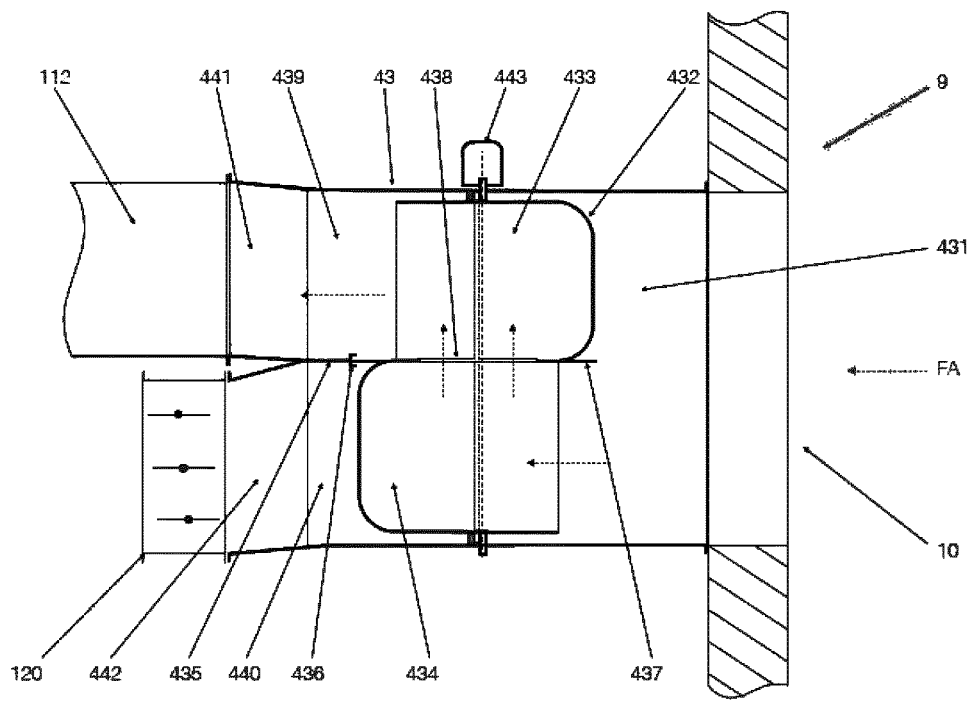
Figure 31:
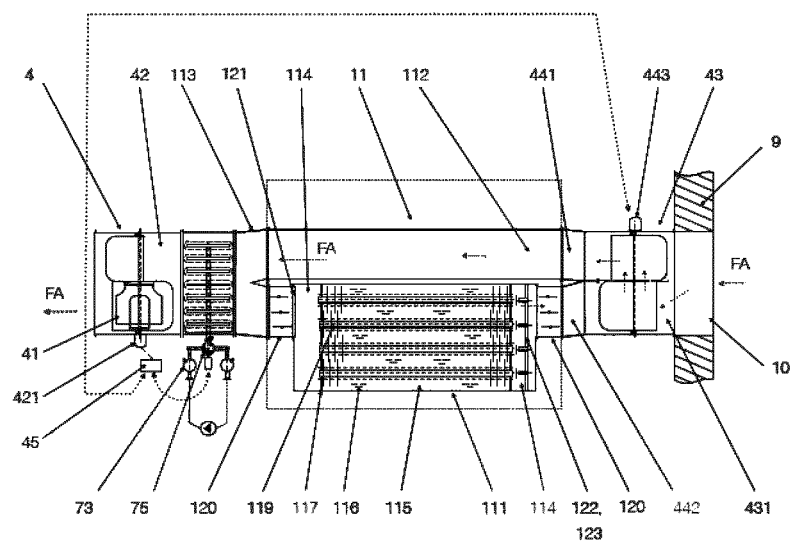
Figure 32:
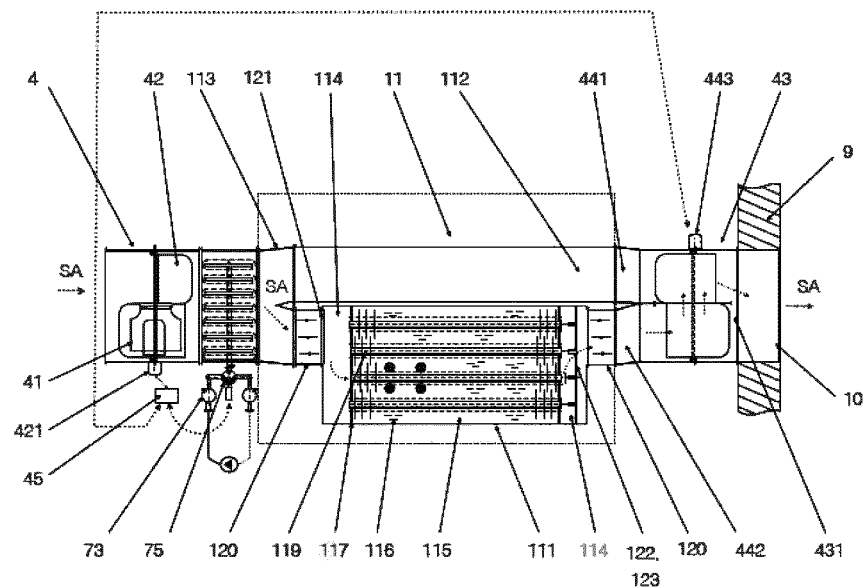
Figure 33:
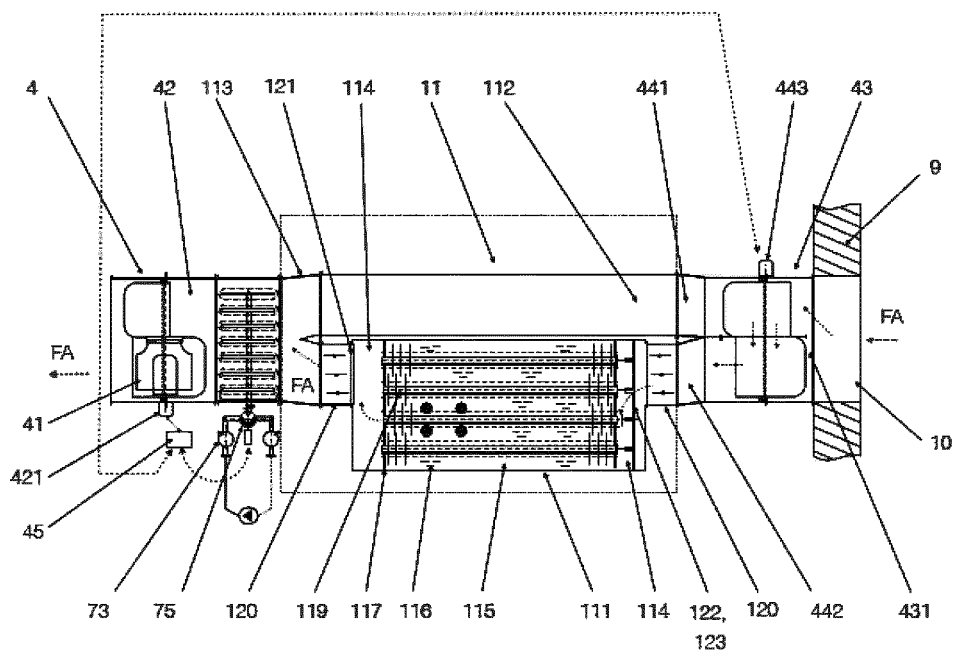
Figure 34:
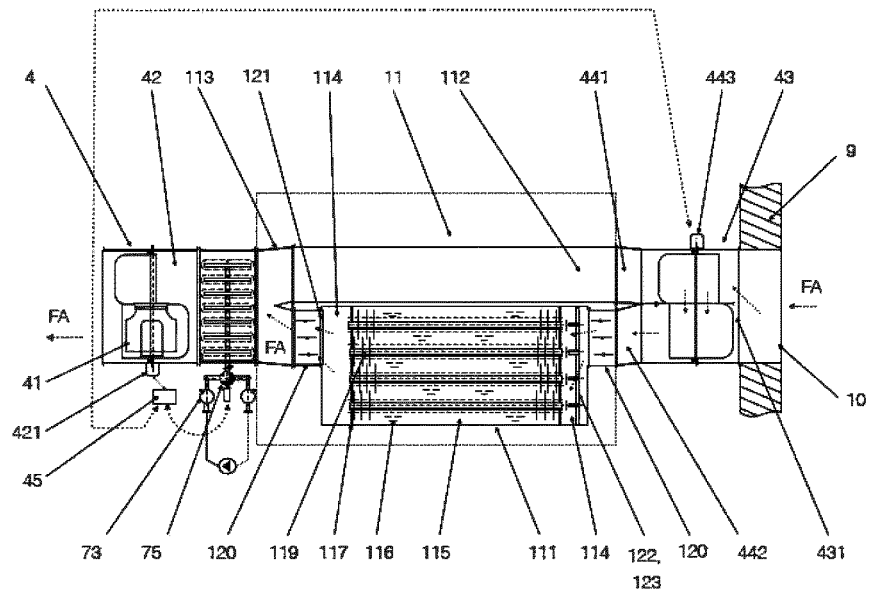
Figure 35:
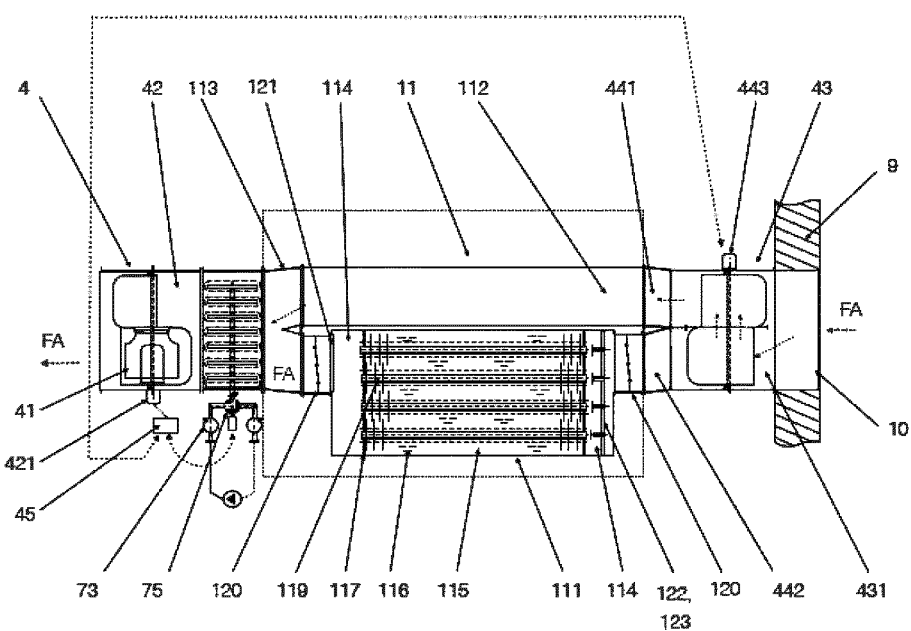

The subject of the invention is shown as an embodiment in the drawing, the individual figures of which depict as follows:

FIG. 1—a longitudinal section of the ventilation device,

FIG. 2—a cross-section of the pressure vessel segment in the heat exchanger with porous filling, FIG. 3—a cross-section of the vessel segment filled with an open-cell metallic or ceramic foam, FIG. 4—a cross-section of the vessel segment with a structural filling of metallic fibres, FIG. 5—a cross-section of the vessel segment with a filling in form of a granular bed, FIG. 6—a longitudinal vertical section of the vessel with horizontal plate chamber segments and a single lower heat exchange system, FIG. 6a—a vertical cross-section of the vessel according to FIG. 6, FIG. 6b—a top view of the vessel according to FIG. 6, FIG. 7—a longitudinal vertical section of the vessel with horizontal plate chamber segments and a double heat exchange system, FIG. 7a—a vertical cross-section of the vessel according to FIG. 7, FIG. 7b—a horizontal cross-section of the vessel according to FIG. 7, FIG. 8—a longitudinal vertical section of the vessel with horizontal chamber segments and a heat exchange system in form of fibrous lagging or open-cell foam, FIG. 8a—a vertical cross-section of the vessel according to FIG. 8, FIG. 8b—a horizontal cross-section of the vessel according to FIG. 8, FIG. 9—a longitudinal vertical section of the vessel with vertical chamber segments and a heat exchange system in the form of horizontal gutters, FIG. 9a—a longitudinal vertical cross-section of the vessel according to FIG. 9, FIG. 9b—a horizontal cross-section of the vessel according to FIG. 9, FIG. 10—a longitudinal vertical section of the vessel with vertical chamber segments and a heat exchange system in the form of fibrous lagging or open-cell foam with gutters, FIG. 10a—a vertical cross-section according to FIG. 10, FIG. 10b—a horizontal cross-section of the vessel according to FIG. 10, FIG. 11 a longitudinal vertical section of the vessel with horizontal tubular segments and a heat exchange system in the form of ribs with gutters, FIG. 11a—a vertical cross-section of the vessel according to FIG. 11, FIG. 11b—a horizontal cross-section of the vessel according to FIG. 11, FIG. 12—a longitudinal vertical section of the vessel with horizontal tubular segments and a heat exchange system in the form of lagging with gutters, FIG. 12a—a vertical cross-section of the vessel according to FIG. 12, FIG. 12b—a horizontal cross-section of the vessel according to FIG. 12, FIG. 13 a longitudinal vertical section of the vessel with vertical tubular segments and a heat exchange system in the form of conical ribs, FIG. 13a—a vertical cross-section of the vessel according to FIG. 13, FIG. 13b—a horizontal cross-section of the vessel according to FIG. 13, FIG. 14—a longitudinal vertical section of the vessel with vertical tubular segments and a heat exchange system in the form of fibrous lagging or open-cell foam, FIG. 14a—a vertical cross-section of the vessel according to FIG. 14, FIG. 14b—a horizontal cross-section of the vessel according to FIG. 14, FIG. 15—a longitudinal vertical section of the vessel with horizontal tubular segments and a heat exchange system in the form of porous material solid, FIG. 15a—a vertical cross-section of the vessel according to FIG. 15, FIG. 15b—a horizontal cross-section of the vessel according to FIG. 15, FIG. 16—a longitudinal vertical section of the vessel with vertical tubular segments and a heat exchange system in the form of porous material solid, FIG. 16a—a longitudinal vertical section of the vessel according to FIG. 16, FIG. 16b—a horizontal cross-section of the vessel according to FIG. 16, FIG. 17—a longitudinal vertical section of the vessel with an emergency drip tray without outlet, FIG. 18—a vertical section of the vessel with a drip tray without outlet, equipped with a heating element, FIG. 19—a vertical section of the vessel with a drip tray without outlet, equipped with a sprinkling system with a condensate pump, FIG. 20—a vertical section of the vessel with a drip tray equipped with a condensate outlet, FIG. 21—a schematic view of the working agent pressure control system in the pressure vessel with use of a compressor, FIG. 22—a schematic view of the working agent pressure control system with use of a household device, FIG. 23—a schematic view of a pressure control system in the working agent vapour condensation phase, with a two-way valve in pumping position, in the blowing mode in the winter season, FIG. 24—a schematic view of a pressure control system in the working agent evaporation phase, with a two-way valve in suction position, in the blowing mode in the summer season, FIG. 25—a schematic view of the pressure control system with a closed two-way valve, in the passive mode, in the blowing phase in the summer season, FIG. 26—a schematic view of the pressure control system with a closed two-way valve, in the passive mode, in the exhaust phase in the summer season, FIG. 27—a longitudinal section of the ventilation device with the prolonged heat store functioning in the summer season in the exhaust phase, FIG. 28—a longitudinal section of a heat store fragment with an air distribution system, FIG. 29—a cross-section of a heat store fragment according to FIG. 28, FIG. 30—a longitudinal vertical section of the secondary air driver, FIG. 31—a longitudinal section of the device with the prolonged heat store functioning in the summer season in the active mode in the blowing phase, FIG. 32—a longitudinal section of the device, while absorbing heat, by the spent air from the momentary heat store, with the heat exchanger in the passive mode in the summer season in the exhaust phase at night, FIG. 33—a longitudinal section of the device during heat giving up by the fresh air to the momentary heat store, with the heat exchanger in passive mode in the summer season in the blowing phase during the day, FIG. 34—a longitudinal section of the device while absorbing heat by the fresh air from the prolonged heat store, with the heat exchanger in active mode in condensation cycle in the winter season in the blowing phase, FIG. 35—a longitudinal section of the device during fresh air flow through the shunt duct while by-passing the prolonged heat store, with the heat exchanger in active mode in condensation cycle in the transitory season in the blowing phase.

Ventilation device according to the invention has a pass-through, horizontally oriented housing 1 that is a duct for air flow and is connected to the opening 10 of the building partition 9, in particular of the building wall. As shown in FIG. 1, the following components are arranged in series inside the housing 1, from left to right: the spent air filtration section 2, the noise suppression section 3, the air pumping section 4 with the centrifugal fan 41 of constant rotation direction and the main reversible rotational air driver 42, the stationary regenerative heat exchanger 5 for heat recovery from the air jet and the fresh air filtration section 6. The detailed solution of the air pumping section 4 with the centrifugal fan 41 and the main reversible air driver 42 is well-known from the patent specifications PL 232075 B1 and WO 2018/030903 A1. The device housing 1 and the air driver 42 are made of plastic. The heat exchanger 5 has the metallic pressure vessel PV made, first of all, of copper or aluminium, with at least one heat exchange system 51 fastened to its walls 53. The interior 531 of the pressure vessel PV is filled with the thermodynamic working agent WA. Depending on needs, the working agent WA can be water or low-boiling mixture of hydrocarbons or ammonia or carbon dioxide. According to FIG. 2, the interior 531 of the PV tank is additionally filled with a porous material having high thermal conductivity and capillary holding capacity for the liquid form of the working agent WA. Porous material of such a type can be open-cell metallic foam 532 or ceramic foam 533, structural filling 534 of metallic fibres as well as granular bed 535 of ceramic material, metal or plastic whereof granules have surfaces of any shape.

As shown in FIG. 6, the pressure vessel PV consists of many mutually parallel segments 54 that are connected to each other by pressure fasteners 57 and additionally connected to the pressure connector 71 of the pressure control system 7 by means of the pressure collector 58. In the embodiment according to FIG. 7, segments of the vessel PV are plate elements 55 in the form of flat compartments 551 spread horizontally in accordance with the air flow direction. Each flat compartment 551 of the pressure vessel PV is provided with two heat exchange systems 525, 526 arranged one over the other and made of material of high heat conduction. In turn, each heat exchange system 525, 526 in the horizontal compartment 551 of the pressure vessel PV consists of many vertically oriented ribs 511 that are located inside the shallow horizontal tray 512 and connected permanently to its bottom to maintain good thermal conduction. The upper heat exchange system 525 is fastened to the horizontal compartment 551 recumbently, so that the bottom of the tray 512 adheres directly to the upper surface of this compartment. The lower heat exchange system 526 is fixed to the horizontal compartment 551 in hanging position, so that all ribs 511 are fastened to the lower surface of this compartment, however, the tray 512 is underslung to the vertical ribs.

In the embodiment according to FIG. 8, each heat exchange system 525, 526 in the horizontal compartment 551 of the pressure vessel PV is formed of hygroscopic lining of metallic or ceramic open-cell foam 517 structure or metallic fibrous structure 518 that is located inside the horizontal tray 512 and connected permanently to its bottom to maintain good thermal conduction. The upper heat exchange system 525 is fastened to the horizontal compartment 551 recumbently, so that the bottom of the tray 512 adheres directly to the upper surface of this compartment and the lower heat exchange system 526 is fixed to the horizontal compartment 551 in hanging position, so that the lining 517 or 518 is fastened to the lower surface of this compartment, however, the tray 512 is underslung to the lining 517 or 518.

In the embodiment according to FIG. 9, segments of the pressure vessel PV are plate elements 55 in the form of flat compartments 552 spread vertically in accordance with the air flow direction. Each vertical compartment 552 of the pressure vessel PV has heat exchange system 51 formed of longitudinally oriented horizontal gutters 513 that are made of material of high heat conduction and connected permanently to opposite external surfaces of this compartment to maintain good thermal conduction.

According to FIG. 10, each vertical compartment 552 of the pressure vessel PV has heat exchange system 51 in the form of hygroscopic lining of metallic or ceramic open-cell foam 517 structure or metallic fibrous structure 518 that is made of high heat conduction material and connected permanently to opposite external surfaces of this compartment to maintain good thermal conduction.

In the embodiment according to FIG. 11, segments of the pressure vessel PV are tubular segments 56 that are spread horizontally and also perpendicularly to the air flow direction. Each horizontal tubular segment 561 of the pressure vessel PV has heat exchange system 51 in the form of a set of transverse ribs 514, bottom edges of which are joined with the horizontal gutter 515.

According to FIG. 12, each horizontal tubular segment 561 of the pressure vessel PV has heat exchange system 51 in the form of hygroscopic lagging of metallic fibrous structure 518 or open-cell metallic or ceramic foam 517 structure, edges of which are joined with the horizontal gutter 515.

In the embodiment according to FIG. 13, 13a, 13b, segments of the pressure vessel PV are the tubular segments 562 that are spread vertically and also perpendicularly to the air flow direction. Each vertical tubular segment 562 of the pressure vessel PV has heat exchange system 51 in the form of conical ribs 516 arranged one above the other which are reservoirs for condensing moisture.

According to FIG. 14, 14a, 14b, each of vertical tubular segments 562 of the pressure vessel PV has heat exchange system in the form of hygroscopic lagging of metallic fibrous structure 518 or open-cell metallic foam 517 structure with conical ribs 516 that are arranged along the axis of the tubular segment 562.

In the embodiment according to FIG. 15, heat exchange system 51 in the pressure vessel PV is the porous material solid 524 wherein the horizontal parallel segments 551 or 561 are plunged, however, in the embodiment according to FIG. 16, the heat exchange system 51 in the pressure vessel PV is also the porous material solid 524 wherein the vertical parallel segments 552 or 562 are plunged. In both embodiments, the porous solid 524 is made of material of metallic fibrous structure 518 or metallic or ceramic open-cell foam 517 structure.

As shown in FIG. 17, heat exchanger 5 is provided with the emergency drip tray 519 mounted in the lower part of the housing 1 below the heat exchange system 51. In the embodiment according to FIG. 18, the emergency drip tray 519 is in the form of a tray without outlet, provided with an electric heating element 520. According to FIG. 19, the emergency drip tray 519 is in the form of a tray without an outlet with a sprinkling system 522 of the heat exchange system 51 and it is provided with a water condensate pump 521. In another embodiment according to FIG. 20, the emergency drip tray 519 is provided with an outlet 523 of condensate to sewerage.

The cyclic discrete pressure control system 7 of the working agent WA according to FIG. 21 is provided with a vapour compressing device 72 in the form of a well-known compressor 78. Its outlet port 721 is connected to a high pressure buffer vessel 73 provided with a high pressure sensor 731 while the inlet port 722 is connected to a low pressure buffer vessel 74 equipped with a low pressure sensor 741. Moreover, this system is provided with a three-position two-way valve 75 that is included in the working agent WA cycle and its output is connected to a connection connector 71. This valve has the electric drive 751 that is synchronized with the electric drive of the main air flow deflector 42 by means of the electronic control system 44.

As shown in FIG. 22, the vapour compressing device 72 can also be a well-known household device 8 in the form of a refrigerator, a freezer, a refrigerated counter, an air conditioner or a heat pump for heating purposes. This device is provided with a working agent compression system WA connected to the high pressure buffer vessel 73 through a high pressure conduit 76 and to the low pressure buffer vessel 74 through a low pressure conduit 77.

In FIG. 23, the pressure control system 7 of the working agent WA is shown in its vapour condensation phase, with the two-way valve 75 in pumping position, FIG. 24 shows the pressure control system 7 of the working agent WA in its evaporation phase with the two-way valve 75 in the suction position while FIG. 25 shows the pressure control system 7 of the working agent WA in the passive heat transfer mode, with closed two-way valve 75, and in FIG. 26, the pressure control system 7 of the working agent WA is shown in the passive heat transfer mode.

According to FIG. 29, the ventilation device built of the heat exchanger 5, the air pumping section 4 with the fan 41 and the main air deflector 42, and the fresh and spent air filtration as well as noise suppression sections not shown in the drawing, is equipped with the heat accumulation module 11 surrounded by thermal insulation not shown in the drawing and located between the heat exchanger 5 and the opening 10 of the building partition 9. The secondary reversible air deflector 43 with its own drive 443 is connected to the module 11 on the side of the opening 10 of the building partition 9, this drive being synchronized with the drive 421 of the main air deflector 42 by means of electronic control system 45. As shown in FIG. 30, the secondary air deflector 43 has the longitudinal duct 431 wherein the uniform rotational crosswise bearing-mounted body 432 is located and built of two bowls 433, 434 adherent to each other and open into the opposite sides, and separated with the circular flange 437. This flange is spread perpendicularly to the rotation axis of the body 432 and has the central opening 438. Moreover, the longitudinal partition 435 with the concave arched rim 436 that is in mesh with the flange 437 of the body 432 is formed in the duct 431. Finally, the duct 431 is divided by means of the partition 435 and the flange 437 into two longitudinal zones 439, 440 situated one over the other. The heat accumulation module 11 consists of the flow heat store 111 with the shunt duct 112 spread longitudinally. The secondary air deflector 43 on the heat accumulation module 11 side has two connectors 442 and 441 located at outlet of its longitudinal zones 440, 439 whereto the final parts of the heat store 111 and the shunt duct 112 are connected, while the opposite final parts of the heat store 111 and the shunt duct 112 are connected to the heat exchanger 5 by means of a pipe tee 113. The heat store 111 consists of two air distribution compartments 114 that are separated from each other with two opposite partitions 117 and of the closed compartment 115 formed between them and filled with a heat storing material 116. Each of the partitions 117 of the heat store 111 has openings 118 wherein the ends of many metallic pipes 119 situated parallelly for air flow between air distribution compartments 114 are tightly mounted. The heat store 111 is provided with cutting off air dampers 120 that are located in inlets of the air distribution compartments 114. One of these compartments is provided with the air distribution system 122 consisting of the set of air valves 124 driven individually that have individual drives not shown in the drawing and are mounted on the common bracket 123. Each valve 124 closes at least one pipe 119 for air flow. The heat storing material 116 in the closed compartment 115 of the heat store 111 is the well-known organic or inorganic liquid or solid substance solidifying or melting respectively at temperature close to the room temperature.

Operation of the ventilation device is based on exact synchronization of the working phase with cycles of the working agent WA phase changes inside the pressure vessel PV. The working agent WA evaporation cycle results in cooling the air jet flowing through the heat exchanger 5, while the working agent WA condensation cycle results in heating the air jet flowing through the heat exchanger 5. The device operates in blowing and exhaust phases that occur alternately while following changes of the direction of the air jet flow through the heat exchanger 5 as a result of operation of the air pumping section 4 provided with the fan 41 built in the main reversible air jet deflector 42. The working phase changes occur as a result of rotational motion of the main air deflector 42 and they are coordinated with the changes of the working agent WA gas transition cycles, occurring as a result of switching the ways of the two-way valve 75. Duration of each of the working phases is the same wherein a moment of the gas transition cycle change is determined depending on indications of the temperature sensors 79 of the air flowing through the heat exchanger according to the algorithm implemented by electronic control system 45. The gas transition cycle change moment may precede the working phase change moment in order to bring the heat exchanger 5 temperature to the desired value in the next working phase. While cooling ventilated rooms during the summer season, during the exhaust of the cool spent air SA, the heat exchanger 5 heated in the working agent WA condensation cycle is cooled to the temperature that does not exceed the room temperature in the final exhaust phase. The purpose of shifting the moment of changing the gas transformation cycles in relation to the moment of changing the operating phases is to prevent a situation where the air of too high temperature would be blown into the cooled room. The heat exchanger 5 operates in two modes, active or passive, wherein cycles of the working agent WA evaporation and condensation occur alternately. In the active working mode, evaporation or condensation of the working agent WA occurs as a result of the pressure lowering or raising respectively inside the pressure vessel PV by means of the pressure control system 7, thanks to energy supplied from outside.

The cycle of the working agent WA evaporation occurs when the two-way valve 75 is in suction position and the compressor 78 decreases pressure inside the pressure vessel PV while compressing the working agent WA in the closed high pressure buffer vessel 73. The cycle of the working agent WA condensation occurs when the two-way valve 75 is in pumping position and the compressor 78 increases pressure inside the pressure vessel PV while generating a partial vacuum in the closed low pressure buffer vessel 74. In the active working mode, the heat exchanger 5 with the pressure control system 7 is a heat pump of periodic operation that allows obtainment of the determined temperature of jets of spent air SA and fresh air FA. Particularly in the summer season, the heated spent air SA exhaust phase in the active mode ends when the heat exchanger 5 temperature is equal to the air temperature in the ventilated cooled room. Duration of the blowing phase and the exhaust phase is always the same and determined based on comparison of the fresh air FA temperature in the blowing phase with the present air temperature in the ventilated room. In the passive working mode, the cycles of the working agent WA evaporation or condensation in the constant volume of the pressure vessel PV occur, when the two-way valve 75 is closed, under the influence of the working agent WA temperature raising or lowering respectively as a result of the pressure vessel PV with the heat exchange system 5 being flown around by the spent air SA and the fresh air FA of different temperatures measured with the temperature sensors 79. A preliminary, preferable value of the working agent WA pressure is selected by means of the control system 45, while its stabilization on the advantageous level takes place using the two-way valve 75 that responds to indications of the pressure gauge 711. The passive working mode is used when temperatures of the air jets differ to a small extent and a preliminary working agent WA pressure ensures alternate evaporation and condensation of as great quantity of the working agent WA as possible during each of the device working phases. In the passive working mode, the device according to the invention is a momentary heat store. The heat of the working agent WA phase changes is used in its useful form to cool or heat the fresh blown air depending on the season.

During the heating season, in the passive working mode, in the phase of the spent air SA exhaust from the ventilated room, the heat exchanger 5 warms itself with the heat of the exhausted air SA while cooling it at the same time. However, in the blowing phase, the fresh air FA from outside warms itself in the previously heated heat exchanger 5 while cooling it at the same time. As a result, the blown air is insignificantly cooler than the air in the ventilated room. In the active working mode in the heating season, in the air blowing phase, the working agent WA pressure is increased inside the vessel PV by expenditure of external energy which leads to the condensation of this medium and the release of the heat of condensation. The heat exchanger 5 maintains its accumulating function in the active working mode longer and if the working agent WA is compressed enough, the blown air FA warms to the temperature exceeding the temperature of the ventilated room. Before the blowing phase is replaced by the exhaust phase, the heat exchanger 5 heated up in the active working mode is being cooled passively with the blown air FA until this air temperature equals the air temperature in the ventilated room. In turn, in the exhaust phase, the previously condensed working agent WA evaporates as a result of its pressure reduction induced by expenditure of external energy, while absorbing heat necessary for its evaporation from the ambience. The heat exchanger 5 cooled in this way cools the spent air SA. Before the exhaust phase is replaced by the blowing phase, the heat exchanger 5 is heated up passively with the exhausted spent air SA within the time established in the preceding blowing phase.

In the cooling season, in the passive working mode and in the exhaust phase of the spent air SA, the heat exchanger 5 that was heated up previously with the external air cools down under influence of the exhausted cool spent air SA while heating it up at the same time. In the blowing phase, the fresh air FA blown from the outside cools down in the previously cooled heat exchanger 5. Finally, the air in the ventilated room is insignificantly cooler than the blown air. In the cooling season, in the active working mode and in the blowing phase of the fresh air FA, the working agent WA pressure is lowered with expenditure of external energy which leads to the evaporation of this medium and the absorption of the heat of vaporization by the heat exchanger 5. The heat exchanger 5 cooled in this way cools the blown air down. Before the blowing phase is replaced by the exhaust phase, the heat exchanger 5 cooled down in the active working mode is heated up passively with the blown fresh air FA until the air temperature in the ventilated room equals the blown air temperature. In the exhaust phase, the previously evaporated working agent WA condensates as a result of pressure increase induced by expenditure of external energy, while giving up the heat of condensation to the ambience. The heat exchanger 5 heated up in this way heats the exhausted spent air SA. Before the exhaust phase is replaced by the blowing phase, the heat exchanger 5 is cooled down passively with the exhausted spent air SA within the time established in the preceding blowing phase.

Operation of the ventilation device with the heat accumulation module 11 consists in such a synchronization of the main air deflector 42 position with the secondary air deflector 43 position to allow, both in the exhaust and the blowing phases, the air flowing alternately through the shunt duct 112 and through the heat store 111, whereat FIG. 27 shows the ventilation device with the heat accumulation module 11 during storage of the working agent WA heat of condensation in the summer season, in the exhaust phase, with the air flow through the heat store 111. In this configuration, both cutting off dampers 120 remain open under influence of the signal from the control system 45 and the secondary air deflector 43 driven with an actuator 443 occupies a position opening the air flow through the heat store 111 while closing flow through the bypass duct 112 at the same time. Moreover, all air valves 124 remain open and consequently, the whole spent air SA jet flows through all air pipes 119 and the working agent WA heat of condensation in the exchanger 5 is taken over by the spent air SA jet and transferred to the phase-change material 116 in the store 111.

FIG. 31 shows the ventilation device with the heat accumulation module 11 in the blowing phase in the summer season, with the air flow through the bypass duct 112. In this configuration, both cutting off dampers 120 remain open under influence of the signal from the control system 45 and the secondary air deflector 43 occupies a position opening the air flow through the bypass duct 112 while closing the flow through the heat store 111 at the same time. Even though all air valves 124 remain open, the whole fresh air FA jet flows through the bypass duct 112 and further through the heat exchanger 5 wherein it cools down in contact with its heat exchange structure cooled down due to evaporation of the working agent WA.

In FIG. 32, the ventilation device is shown in the summer season, in the phase of air exhaust by the heat store 111, with the heat exchanger 5 in the passive mode when the spent air SA has lower temperature than freezing temperature of the phase-change material 116. Thanks to selective opening of some of the valves 124, the spent air SA is pumped only by a single air pipe 119 or a section comprising some air pipes 119. In advantageous time intervals, the open valves 124 are closed and the next their portion is open. Sequential use of only a part of the heat store 111, whereby the whole spent air FA jet flows periodically, prolongs advantageously time of heat removal from the solidified layer of the phase-change material 116 that adheres directly to the surface of the pipes 119, far inside the closed compartment 115 of the heat store 111. This guarantees continuous use of the phase change heat in the process of heat transfer from the ventilating fresh air FA or spent air SA to the heat store 111.

According to FIG. 35, in the ventilation device in the summer season in the blowing phase on a scorching day, the fan 41 sucks in the hot fresh air FA through this part of the air pipes 119 of the heat store 111, around which the solidified phase-change material 116 lies and, as a result, the fresh air FA cools down to the melting point of the phase-change material.

In ventilation device according to FIG. 34, in the winter season in the blowing phase, the frosty fresh air FA flows through all air pipes 119 of the heat store 111 wherein the whole phase-change material 116 is liquid, heats up to its freezing temperature and then is heated up in the heat exchanger 5 in the cycle of the working agent WA condensation.

According to FIG. 35, in the ventilation device in the transitory autumn season, the heat store 111 is fully filled with the molten phase-change material 116 and remains isolated from external environment thanks to closing both dampers 120. The secondary air deflector 43 remains motionless in the position that allows air flow through the shunt duct 112. Both the fresh air FA blowing and the spent air SA exhaust occur through the bypass duct 112.

Capabilities of the invention implementation are not limited to the embodiment shown. A two-fan ventilation device equipped with two heat exchangers can also operate based on the above-mentioned principles. In the suchlike device, a working agent compression and expansion system is common for both heat exchangers and it operates so that when a working agent pressure decreases in one heat exchanger, in the second heat exchanger a working agent pressure increases.

The device according to the invention can be used in industrial processing, particularly in flue gas cooling process in boilers.

MARKING LIST

1—housing
2—exhaust air filtration section
3—noise attenuation section
4—air pumping section
41—fan
42—main air deflector
421—main deflector drive
43—secondary air deflector
431—deflector duct
432—deflector body
433—body bowl
434—body bowl
435—duct partition
436—partition rim
437—body flange 438—flange opening
439—upper duct zone
440—lower duct zone
441—secondary deflector upper connector
442—secondary deflector lower connector
443—driving actuator of secondary deflectors
45—control system of air deflectors and two-way valve
5—heat exchanger
51—heat exchange system
511—horizontal vessel compartment rib
512—horizontal vessel compartment tray
513—vertical vessel compartment gutter
514—transversal rib of tubular vessel segment
515—gutter of tubular vessel segment
516—conical rib of tubular vessel segment
517—lagging foam
518—fibrous lagging structure
519—emergency drip tray
520—heating element
521—condensate pump
522—sprinkling system
523—condensate outlet
524—porous material solid
525—upper heat exchange system
526—lower heat exchange system
53—pressure vessel wall
531—pressure vessel interior
532—porous metallic vessel filling
533—porous ceramic vessel filling
534—fibrous structure of vessel filling
535—granular bed of vessel filling
54—pressure vessel segment
55—vessel plate segment
551—horizontal compartment of vessel segment
552—vertical compartment of vessel segment
56—tubular vessel segment
561—horizontal tubular vessel segment
562—vertical tubular vessel segment
57—pressure connector of vessel segments
58—pressure collector
6—fresh air filtration section
7—pressure control system
71—connection connector
711—pressure sensor in vessel PV
72—vapour compressing device
721—outlet port
722—inlet port
73—high pressure buffer vessel
731—high pressure sensor
74—low pressure buffer vessel
741—low pressure sensor
75—two-way valve
751—valve drive
76—high pressure conduit
77—low pressure conduit
78—compressor
79—air temperature sensor
8—household device
9—building partition
10—partition opening
11—heat accumulation module
111—heat store
112—by-pass duct
113—pipe tee
114—air distribution compartment
115—closed compartment
116—heat storing material
117—store partition
118—partition opening
119—air pipe
120—cutting off damper
121—distribution compartment inlet
122—air distribution system
123—air valve set bracket
124—air valve with drive
FA—fresh air
SA—spent air
WA—working agent
PV—pressure vessel

The invention claimed is:

1. A ventilation device with a through housing (1) that is a duct for an air jet flow, wherein
the through housing (1) is connected to an opening (10) of a building partition (9), with a stationary regenerative heat exchanger (5) and a pumping section (4) formed of a centrifugal fan (41) of constant rotation direction and a main reversible air jet driver (42) with an individual drive (43) arranged in series inside the housing (1), characterized in that the heat exchanger (5) is provided with a metallic pressure vessel (PV) with at least one heat exchange system (51) attached to walls (53) of the pressure vessel (PV), wherein
an interior (531) of the pressure vessel (PV) is filled with a thermodynamic working agent (WA) and connected to a cyclic discrete pressure control system (7) of the working agent (WA), wherein
the cyclic discrete pressure control system (7) of the working agent (WA) is provided with a vapour compressing device (72) having an outlet port (721) connected with a high pressure buffer vessel (73) and a high pressure sensor (731), wherein
an inlet port (722) has connection with a low pressure buffer vessel (74) and a low pressure sensor (741), wherein
the cyclic discrete pressure control system is further equipped with a three-position two-way valve (75), included in the working agent (WA) circuit, and wherein
the vapour compressing device (72) is a compressor (78) or a household device (8) provided with the compressor (78) of the working agent (WA) that is connected to the high pressure buffer vessel (73) through a high pressure conduit (76) and to the low pressure buffer vessel (74) through a low pressure conduit (77).

2. The ventilation device according to claim 1, characterized in that the thermodynamic working agent (WA) is any low-boiling mixture of hydrocarbons or water or ammonia or carbon dioxide.

3. The ventilation device according to claim 1, characterized in that the interior (531) of the pressure vessel (PV) is additionally filled with a granular material (535) and with a porous material (532, 533, 534) capable of heat conduction and abilities of capillary holding a liquid form of the working agent (WA), wherein the porous material is in a form of an open-cell metallic foam (532), an open-cell ceramic foam (533) or a fibrous structure (534) of metallic fibres.

4. The ventilation device according to claim 1, characterized in that the pressure vessel (PV) consists of mutually parallel segments (54) that are connected with one another with pressure fasteners (57) and attached to a pressure connector (71) of the pressure control system (7) through a pressure collector (58).

5. The ventilation device according to claim 4, characterized in that the segments of the pressure vessel (PV) are plate elements (55) in a form of flat compartments (551), wherein the flat compartments (551) are outstretched horizontally in accordance with an air flow direction, wherein each flat horizontal compartment (551) of the pressure vessel (PV) has two heat exchange systems (525, 526) that are arranged one over the other and made of a material capable of heat conduction, wherein each heat exchange system (525, 526), located in a horizontal compartment (551) of the pressure vessel (PV), consists of ribs (511), vertical and parallel to the air flow direction located inside a horizontal tray (512) and connected permanently to a bottom of the horizontal tray (512), to maintain good thermal conduction, wherein an upper heat exchange system (525) is fastened to the horizontal compartment (551) recumbently, so that the horizontal tray (512) bottom adheres directly to an upper surface of the horizontal compartment, wherein a lower heat exchange system (526) is fixed to the horizontal compartment (551) in hanging position, so that all ribs (511) are fastened to the lower surface of the horizontal compartment, wherein the horizontal tray (512) is underslung to the vertical ribs (511), wherein each heat exchange system (525, 526) in the horizontal compartment (551) of the pressure vessel (PV) consists of hygroscopic lining of a metallic foam structure (517) or a fibrous metallic structure (518) that is located inside the horizontal tray (512) and connected permanently to a bottom of the horizontal tray (512), to maintain a good thermal conduction, wherein the upper heat exchange system (525) is fastened recumbently to the horizontal compartment (551) so that the horizontal tray (512) bottom adheres directly to an upper surface of this compartment, wherein the lower heat exchange system (526) is fastened to the horizontal compartment (551) in hanging position, so that the lining (517 or 518) is fastened to the lower surface of the horizontal compartment, and wherein the horizontal tray (512) is underslung to the lining (517, 518).

6. The ventilation device according to claim 4, characterized in that the segments of the pressure vessel (PV) are plate elements (55) in a form of parallel flat compartments (552), wherein the parallel flat compartments (552) are outstretched vertically in accordance with air flow direction, wherein each of the vertical compartments (552) of the pressure vessel (PV) has a heat exchange system (51) formed of longitudinal horizontal gutters (513) made of a material capable of heat conduction and connected permanently to opposite external surfaces of the vertical compartment of the pressure vessel (PV) to maintain a good thermal conduction, wherein each vertical compartment (552) of the pressure vessel (PV) comprises the heat exchange system (51) in a form of a hygroscopic lining of an open-cell metallic or ceramic foam (517) structure or metallic fibrous structure (518) that is made of a material capable of heat conduction and connected permanently to opposite external surfaces of the vertical compartment to maintain the good thermal conduction.

7. The ventilation device according to claim 4, characterized in that the segments of the pressure vessel (PV) are in a form of parallel tubular segments (56), wherein the parallel tubular segments (56) are outstretched horizontally and perpendicularly in accordance to air flow direction, wherein each of horizontal tubular segments (561) of the pressure vessel (PV) has a heat exchange system (51) in a form of a set of transverse ribs (514), wherein bottom edges of the transverse ribs are joined with a horizontal gutter (515), or each of the horizontal tubular segments (561) of the pressure vessel (PV) has the heat exchange system (51) in a form of a hygroscopic lagging of fibrous metallic structure (518) or an open-cell metallic or ceramic foam (517) structure, wherein lower edges of the structure are joined with the gutter (515) spread horizontally.

8. The ventilation device according to claim 1, characterized in that the segments of the pressure vessel (PV) are in a form of parallel tubular segments (562), wherein the parallel tubular segments (562) are outstretched vertically and perpendicularly to an air flow direction, wherein each vertical tubular segment (561) of the pressure vessel (PV) has a heat exchange system (51) in a form of conical ribs (516) arranged one over the other that are vessels for condensing moisture, wherein each vertical tubular segment (562) of the pressure vessel (PV) has the heat exchange system (51) in a form of a hygroscopic lagging of fibrous metallic structure (518) or an open-cell metallic or ceramic foam (517) structure with the conical ribs (516) arranged along a tubular segment (562) axis.

9. The ventilation device according to claim 5, characterized in that a heat exchange system (51) in the pressure vessel (PV) is a solid (524) porous material, wherein parallel segments (551, 552, 561, 562) of the vessel are plunged, wherein the solid (524) of the heat exchange system (51) is formed of material of a metallic fibrous structure (518) or an open-cell metallic or a ceramic foam (517) structure.

10. The ventilation device according to claim 1, characterized in that the heat exchanger (5) is provided with an emergency drip tray (519), wherein the emergency drip tray (519) is located in a lower part of the housing (1) below the heat exchange system (51), wherein the emergency drip tray (519) is in a form of a tray without an outlet, provided with an electric heating element (520) or a sprinkling system (522) of the heat exchange system (51), further provided with a water condensate pump (521), or the emergency drip tray (519) has a gravitational or forced outlet (523) of condensate into a sewage drain.

11. The ventilation device according to claim 1, characterized in that the two-way valve (75) of the cyclic discrete pressure control system (7) of the working agent (WA) comprises an electric drive (751) that is synchronized with an electric drive of a main reversal air flow deflector (42) by means of an electronic control system (45).

12. The ventilation device according to claim 1, characterized in that a heat accumulation module (11) is located between the heat exchanger (5) and the opening (10) of the building partition (9), wherein a secondary reversible air deflector (43), with an individual drive (433) of the air deflector (43), is connected to the heat accumulation module on a side where the opening (10) of the building partition (9) is located, wherein the drive (433) of the secondary air deflector (43) is synchronized with a drive (421) of a main air deflector (42) by means of an electronic control system (45), and this secondary air deflector (43) has the longitudinal duct (431), wherein an uniform rotational crosswise bearing-mounted body (432) is located and built of two bowls (433, 434) adherent to each other and open into opposite sides and separated with a circular flange (437) that is spread perpendicularly to the body (432) rotation axis and has the central opening (438), wherein a longitudinal partition (435) with a concave arched rim (436) that is in mesh with the flange (437) of the bearing-mounted body (432) is formed in the duct (431) of the deflector (43), wherein the duct (431) is divided into two longitudinal zones (439, 440) by means of the partition (435) and the circular flange (437), wherein the heat accumulation module (11) comprises a flow heat store (111) and a bypass duct (112), wherein the secondary air drive (43) on the heat accumulation module (11) side has two connectors (442, 441), wherein final parts of the heat store (111) and the bypass duct (112) are connected, and wherein opposite final parts of the heat store (111) and the bypass duct (112) are connected to the heat exchanger (5) by means of a pipe tee (113).

13. The ventilation device according to claim 12, characterized in that the heat store (111) comprises two air distribution compartments (114) that are separated from each other with two opposite partitions (117) and a closed compartment (115) formed between the two air distribution compartments (114) filled with a heat storing material (116), wherein each of the partitions (117) has openings (118), wherein ends of parallel pipes (119) for air flow are abuttingly fitted, and the heat store (111) is provided with cutting off air dampers (120) that are located in inlets (121) of the air distribution compartments (114), wherein one of the air distribution compartments (114) in the heat store (111) is provided with an air distribution system (122) comprising a set of air valves (124) driven individually, wherein each set of the valves (124) closes at least one pipe (119) for the air flow.

14. The ventilation device according to claim 13, characterized in that the heat storing material (116) in the closed compartment (115) of the heat store (111) is a liquid substance that solidifies at a room temperature.

\* \* \* \* \*